(12) United States Patent
Kakuta et al.

(10) Patent No.: US 8,302,727 B2
(45) Date of Patent: Nov. 6, 2012

(54) EXHAUST PIPE FOR A VEHICLE

(75) Inventors: Wataru Kakuta, Shizuoka (JP);
Kiyohiko Oguri, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 579 days.

(21) Appl. No.: 12/208,750

(22) Filed: Sep. 11, 2008

(65) Prior Publication Data

US 2009/0065280 A1    Mar. 12, 2009

(30) Foreign Application Priority Data

Sep. 12, 2007 (JP) .................................. 2007-236791
Aug. 8, 2008 (JP) .................................. 2008-206365

(51) Int. Cl.
*B60K 13/04* (2006.01)

(52) U.S. Cl. ....................... 180/296; 180/309

(58) Field of Classification Search .................. 180/309, 180/291, 296, 218, 225, 89.2; 181/228, 249, 181/182

See application file for complete search history.

(56) References Cited

U.S. PATENT DOCUMENTS

| | | | | |
|---|---|---|---|---|
| 3,593,750 A | * | 7/1971 | Zautner | 138/109 |
| 3,655,011 A | * | 4/1972 | Willett | 181/228 |
| 4,564,987 A | * | 1/1986 | Roberts | 29/890.08 |
| 4,690,236 A | * | 9/1987 | Shinozaki et al. | 180/219 |
| 4,800,979 A | * | 1/1989 | Tatsuji | 180/227 |
| 5,016,725 A | * | 5/1991 | Muramatsu | 180/225 |
| 6,247,305 B1 | * | 6/2001 | Bassani | 60/312 |
| 6,378,645 B1 | * | 4/2002 | Uegane et al. | 180/309 |
| 2008/0110687 A1 | * | 5/2008 | Miyashiro et al. | 180/296 |

FOREIGN PATENT DOCUMENTS

| | | |
|---|---|---|
| JP | UM-B-4-018898 | 4/1992 |
| JP | UM-2522667 | 10/1996 |
| JP | 2003-48591 * | 2/2003 |

* cited by examiner

*Primary Examiner* — Frank Vanaman
(74) *Attorney, Agent, or Firm* — Rabin & Berdo, P.C.

(57) ABSTRACT

A vehicle with an engine connection. The vehicle further includes an engine, a rear wheel and a rear suspension that absorbs an impact when the rear wheel moves vertically. The engine connection has a front end connected to a rear surface of the engine, and a coil-shaped portion provided between the rear suspension and the rear wheel. A front end of the coil-shaped portion is connected to a rear end of the engine connection. The exhaust pipe is configured to enable division into the engine connection and the coil-shaped portion.

17 Claims, 25 Drawing Sheets

EXHAUST PIPE FOR A VEHICLE

BACKGROUND OF THE INVENTION

1. Technical Field

The present invention relates to a vehicle, for example a motorcycle, and in particular, relates to an exhaust pipe for a vehicle.

2. Background Art

A vehicle provided with an exhaust pipe is known. For example, Japanese Patent Document JP-UM-B-4-18898 discloses a motorcycle including an exhaust pipe connected to a rear side of an engine, a rear suspension provided below the exhaust pipe to absorb an impact when a rear wheel moves vertically, and a fuel tank provided above the rear suspension and the exhaust pipe. The portion of the exhaust pipe that passes above the rear suspension is formed to be curved vertically in order to ensure a sufficient length of the exhaust pipe.

SUMMARY OF THE INVENTION

In one exemplary aspect of the invention, a vehicle has an engine, a rear wheel, a rear suspension, and an exhaust pipe. The rear suspension absorbs an impact when the rear wheel moves vertically. The exhaust pipe includes an engine connection and a wound portion. A front end of the engine connection is connected to a rear surface of the engine, and the wound portion is provided between the rear suspension and the rear wheel and has a front end connected to a rear end of the engine connection. The exhaust pipe is configured to enable division into the engine connection and the wound portion.

In a vehicle in accordance with the above exemplary aspect of the invention, the wound portion provided between the rear suspension and the rear wheel may be formed on the exhaust pipe whereby the wound portion of the exhaust pipe is provided rearward from, for example, the rear suspension, so that it is possible to prevent the wound portion of the exhaust pipe from being provided above the rear suspension. Thereby, it is possible to prevent a member provided above a rear suspension from being disposed too high in a height direction of the vehicle. Also, by forming the wound portion on the exhaust pipe, it is possible to readily ensure a sufficient length of the exhaust pipe. Also, by configuring the exhaust pipe to be divided into the engine connection and the wound portion, the rear suspension can be mounted, before the wound portion is connected to the engine connection, in a state in which the engine connection is mounted to the rear portion of the engine. Thereby, the process of assembling the exhaust pipe and the rear suspension can be simplified more than when the engine connection of the exhaust pipe and the wound portion are formed integrally.

DETAILED DESCRIPTION OF THE INVENTION

The invention will now be described in more detail by way of example with reference to the embodiments shown in the accompanying Figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially", "essentially" and "nearly", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

The present invention is directed toward an exhaust pipe for a vehicle. In the exemplary embodiments, the vehicle is a motorcycle. However, it is contemplated that the concepts of the present invention may be applied to other types of vehicles within the spirit and scope of the invention. For example, the vehicle may be any vehicle that may use an exhaust pipe, such as a three-wheeled vehicle, or an ATV (all terrain vehicle).

Figure 1:
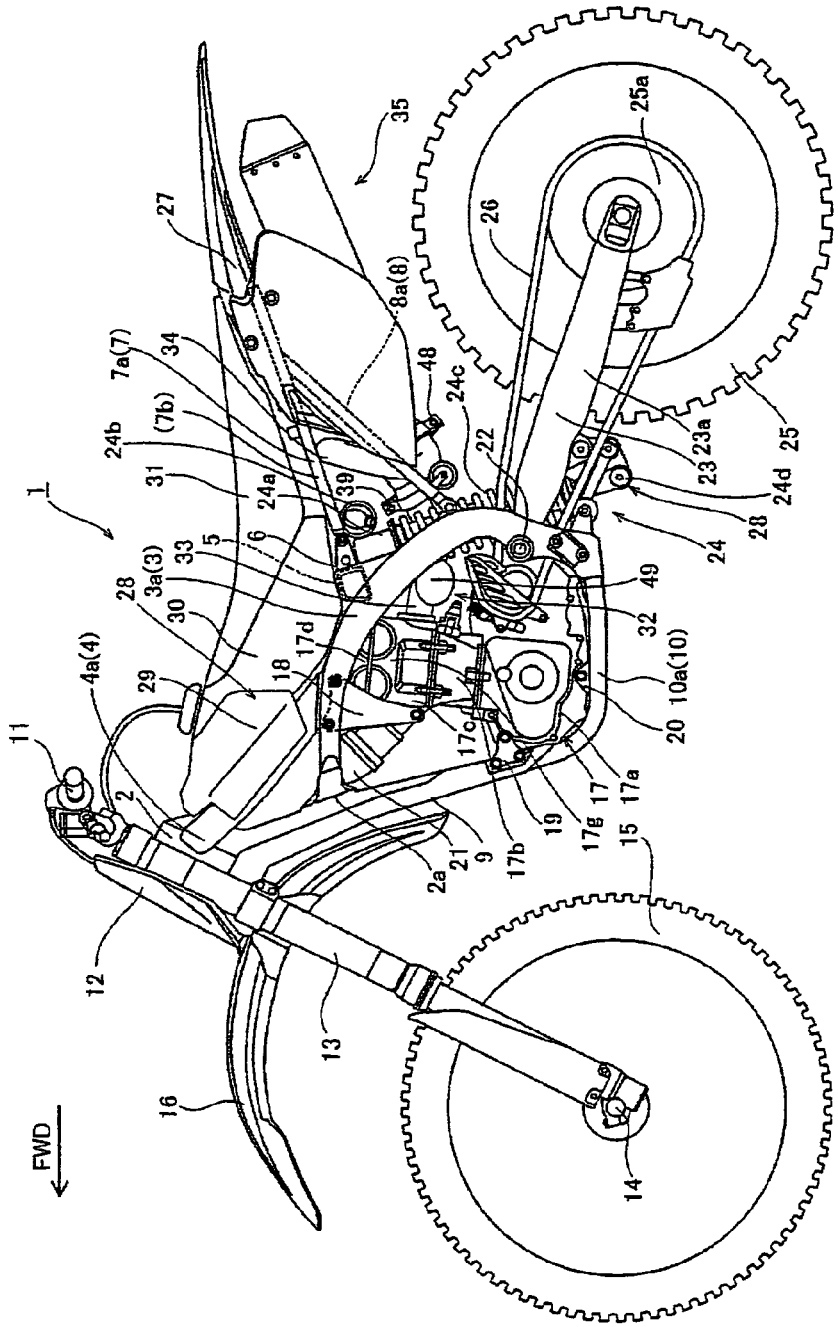
FIG. 1 is a side view showing a whole construction of a motorcycle according to a first exemplary embodiment of the invention.
Figure 2:
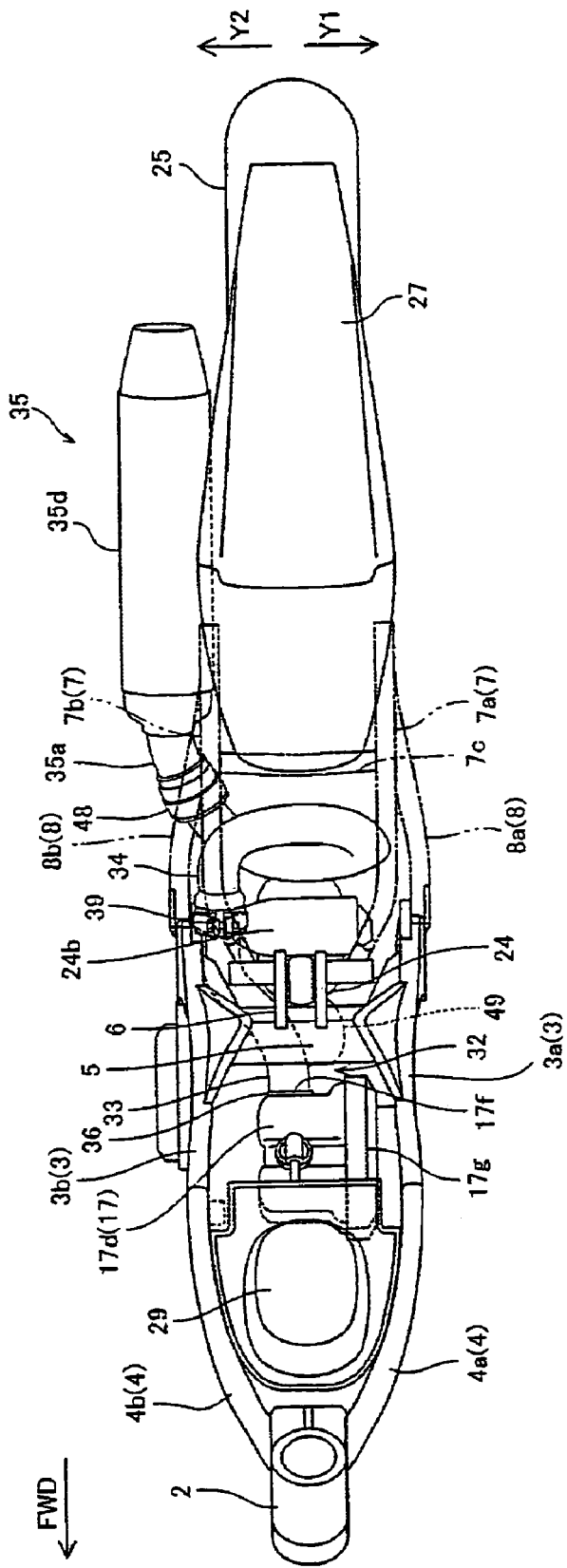
FIG. 2 is a plan view of the motorcycle shown in FIG. 1.

Referring to FIG. 1, a left side view of an entire a motorcycle according to a first exemplary embodiment of the present invention is illustrated. In the drawings, the FWD arrow indicates a forward direction in which the vehicle runs. Any reference to a rearward direction will be taken to mean in a direction opposite to the forward direction. Further, any reference to a front and rear of the vehicle will be used in the usual and customary manner. Moreover, any reference to the vehicle width direction will be taken to mean in a direction perpendicular to the FWD arrow, and in the direction of the arrows Y1 and Y2, as shown in FIG. 2. Additionally when reference is made to a left side of the vehicle, this is taken to mean the side as viewed in the direction of the arrow Y1, i.e., the left side of the vehicle relative to the FWD. The right side will be the side opposite to the right side.

Figure 3:
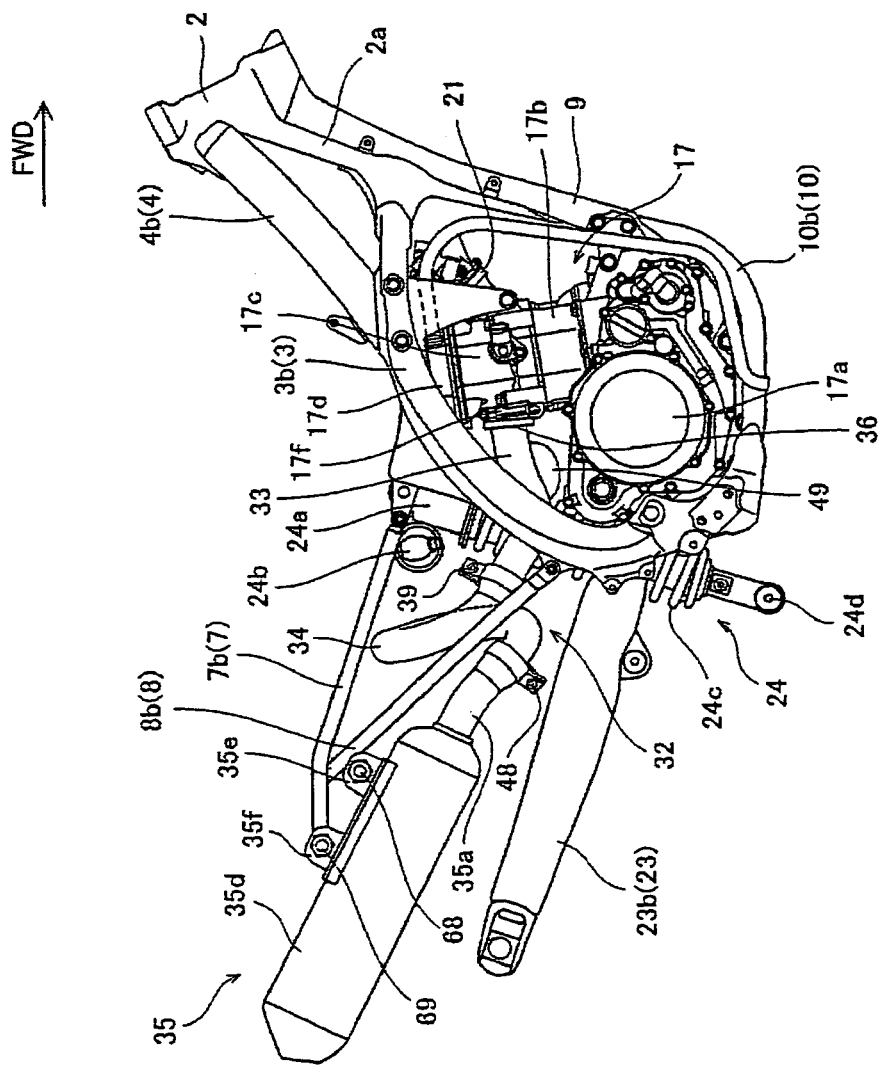
FIG. 3 is a right side view showing an arrangement of the exhaust pipe of the motorcycle shown in FIG. 1.

As shown in FIGS. 1 and 3, a motorcycle 1 according to the first exemplary embodiment of the invention, has a main frame 3 including a left frame 3a (see FIG. 1) and a right frame 3b (see FIG. 3) that are respectively connected to a connection 2a. The connection 2a extends rearward below a head pipe 2. The left frame 3a and the right frame 3b extend rearwardly downward from the connection 2a.

The motorcycle 1 further includes a tank rail which includes a left tank rail 4a (see FIG. 1) and a right tank rail 4b (see FIG. 3). The left tank rail 4a is provided between a rear portion of the head pipe 2 and an upper portion of the left frame 3a, and the right tank rail 4b is provided between the rear portion of the head pipe 2 and an upper portion of the right frame 3b. A front portion of a fuel tank 30, which will be described later in more detail, is provided on the pair of tank rails 4. Also, as shown in FIG. 2, a connecting member 5 connects a rear, upper portion of the left frame 3a and a rear, upper portion of the right frame 3b. A support 6 is formed integrally with the connecting member 5. As shown in FIGS. 1 and 2, connected to the support 6 are a left rail 7a and a right rail 7b, which extend rearwardly upward from the support 6. A rear suspension 24 is further connected to the support 6, which will be described later. A connecting plate 7c connecting the left rail 7a and the right rail 7b is provided between the left rail 7a and the right rail 7b as shown in FIG. 2. The left rail 7a, the right rail 7b, and the connecting plate 7c collectively constitute a seat rail 7. A left stay 8a is mounted between the left frame 3a and the left rail 7a as shown in FIG. 1, and a right stay 8b is mounted between the right frame 3b and the right rail 7b as shown in FIG. 3. The left stay 8a and the right stay 8b constitute a back stay 8. The left stay 8a may be referred to as a "rear frame" of the motor cycle 1.

Also, a downtube 9 is provided below the head pipe 2 and extends rearwardly, downward from the head pipe 2, as shown in FIG. 1. Provided at a lower end of the downtube 9 is a lower frame that includes a left lower frame 10a (see FIG. 1) and a right lower frame 10b (see FIG. 3). The left lower frame 10a connects the downtube 9 and the left frame 3a, and the right lower frame connects the downtube 9 and the right frame 3b.

Also, a turnable handle 11 is provided above the head pipe 2. Also, a Zeichen plate 12 is provided in front of the head pipe 2 to cover the front of the head pipe 2. Also, a pair of front forks 13 are provided below the head pipe 2. An axle shaft 14 is fixed to lower ends of the pair of front forks 13. A front wheel 15 is mounted rotatably to the axle shaft 14. A front fender 16 is provided above the front wheel 15 to cover an upper portion of the front wheel 15, in such a way that its rear end does not interfere with the downtube 9.

Also, an engine 17 is provided below the main frame 3 and rearward from the downtube 9 as shown in FIG. 1. The engine 17 is fixed to support plates 18, 19 and 20 that are respectively fixed to the main frame 3, the downtube 9, and the lower frame 10. The engine 17 may be fixed to the support plates 18 to 20 so that a cylinder axis (not shown) is inclined rearward.

Figure 4:
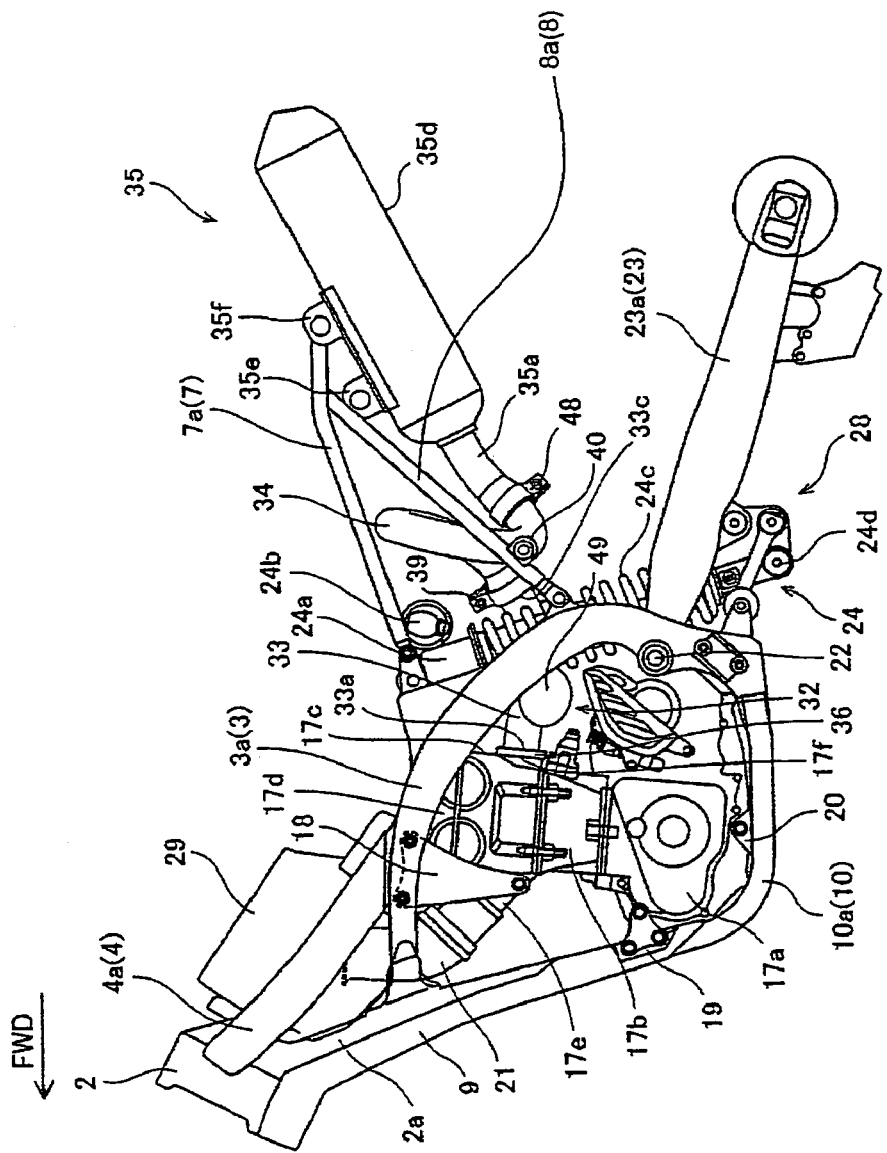
FIG. 4 is a left side view showing an arrangement of the exhaust pipe of the motorcycle shown in FIG. 1.

Also, the engine 17 includes a crank case portion 17a, in which a rotating crank shaft (not shown) is provided, a cylinder portion 17b, a cylinder head portion 17c provided above the cylinder portion 17b, and a cylinder head cover portion 17d. The cylinder portion 17b of the engine 17 includes a single cylinder (not shown) therein. Also, formed on the cylinder head portion 17c of the engine 17 are an intake port 17e extending forward from the engine 17 and an exhaust port 17f provided on a rear surface thereof, as shown in FIG. 4. That is, the engine 17 is a single cylinder engine of a front-intake-rear-exhaust type. Also, the engine 17 includes a cam chain chamber 17g provided on a left side of the cylinder portion 17b (see FIG. 1) and a left side of the cylinder head portion 17c (see FIG. 1). The cam chain chamber bulges in a vehicle width direction as shown in FIG. 2. Also, an intake pipe 21 is connected to and extends forwardly upward from the intake port 17e as shown in FIG. 4.

Also, a pivot shaft 22 is provided on the main frame 3 as shown in FIG. 1. The pivot shaft 22 supports a front end of a rear arm 23 to enable the same to swing vertically. The rear arm 23 includes a left arm portion 23a and a right arm portion 23b (see FIG. 3). Also, the rear suspension 24 is provided between the left rail 7a (see FIG. 4) and the right rail 7b (see FIG. 3) as shown in FIGS. 3 and 4. The rear suspension 24 is provided in a manner to intersect an engine connection 33 of an exhaust pipe 32 which will be more fully described later. Also, a rear wheel 25 is mounted rotatably to a rear end of the rear arm 23 as shown in FIG. 1. Also, a driven sprocket 25a is provided on the rear wheel 25 to rotate together with the rear wheel 25. A chain 26, which is driven by the engine 17, meshes with the driven sprocket 25a. Also, the driven sprocket 25a and the chain 26 are provided leftward in a vehicle width direction. Also, a rear fender 27 is provided above the rear wheel 25 to cover an upper portion of the rear wheel 25.

The rear suspension 24 is provided rearward from the main frame 3 and forward from the rear wheel 25 as shown in FIG. 1. Also, the rear suspension 24 includes a body portion 24a and a subtank portion 24b connected to the body portion 24a. A compression coil spring 24c is provided on an outer periphery of the body portion 24a of the rear suspension 24. Also, the body portion 24a is contractible and extendable in a vertical direction and absorbs an impact when the rear wheel 25 moves vertically. Also, an upper side of the body portion 24a is mounted swingably to the support 6 (see FIG. 2) of the connecting member 5 (see FIG. 2) of the main frame 3. Also, a lower side of the body portion 24a is connected to the rear arm 23 through a linkage 28. Specifically, a lower mount 24d is provided on the lower side of the body portion 24a of the rear suspension 24. The lower mount 24d is mounted swingably to the linkage 28 through a connecting member (not shown). Thereby, it becomes possible to absorb an impact when the rear arm 23 and the rear wheel 25 swing vertically.

Also, an air cleaner 29 is provided between the left tank rail 4a and the right tank rail 4b of the tank rail 4 as shown in FIG. 2. Also, the fuel tank 30 is provided to extend rearward from the air cleaner 29 as shown in FIG. 1. Also, a front portion of a seat 31 is provided above the fuel tank 30. The seat 31 extends rearward from the fuel tank 30.

Figure 5:
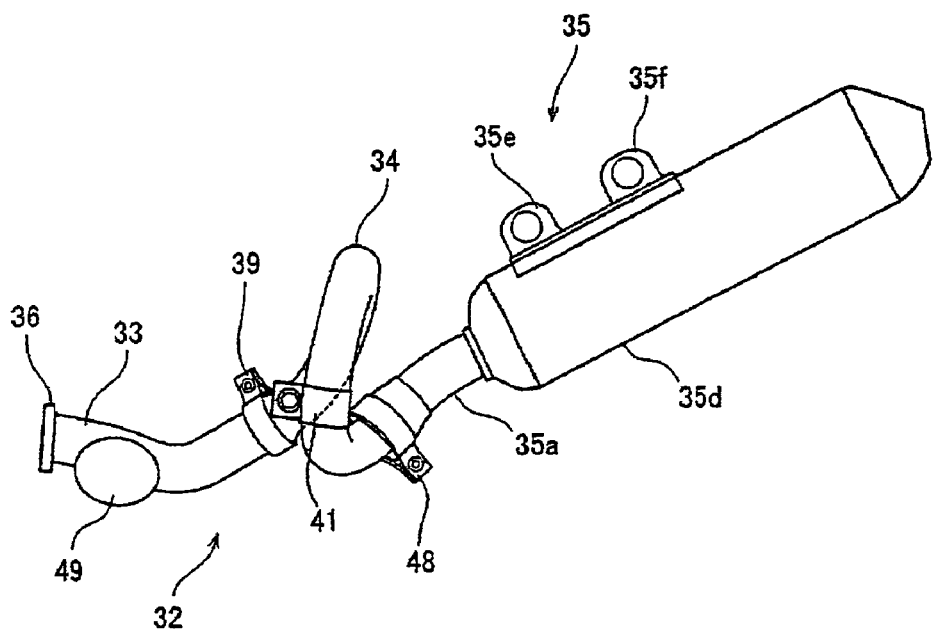
FIG. 5 is a side view showing the construction of the exhaust pipe and a muffler of the motorcycle shown in FIG. 1.
Figure 6:
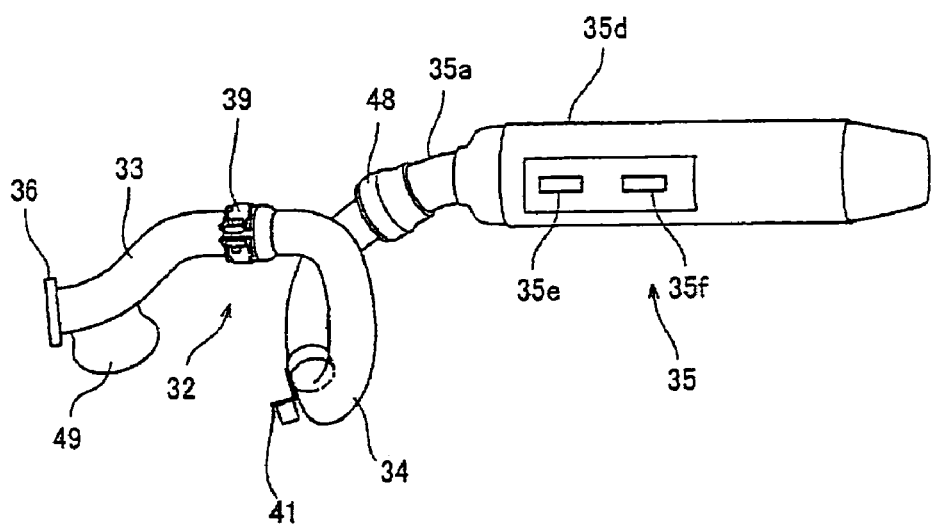
FIG. 6 is a plan view showing the construction of the exhaust pipe and the muffler of the motorcycle shown in FIG. 1.

Here, the exhaust pipe 32, through which exhaust gases from the engine 17 are led, is connected to the exhaust port 17f formed on a rear portion of the cylinder head portion 17c as shown in FIG. 4. The exhaust pipe 32 includes the engine connection 33 and a coil-shaped portion 34. The engine connection 33 includes a front end 33a that is connected to the exhaust port 17f (see FIG. 4) and extends rearward from the exhaust port 17f (see FIG. 4). The coil-shaped portion 34 is connected to the engine connection 33 as shown in FIGS. 5 and 6. Also, a muffler 35 is connected to a side of the coil-shaped portion opposite to the side of the coil-shaped portion 34 that is connected to the engine connection 33. The coil-shaped portion 34 may be referred to as a "wound portion."

Figure 7:
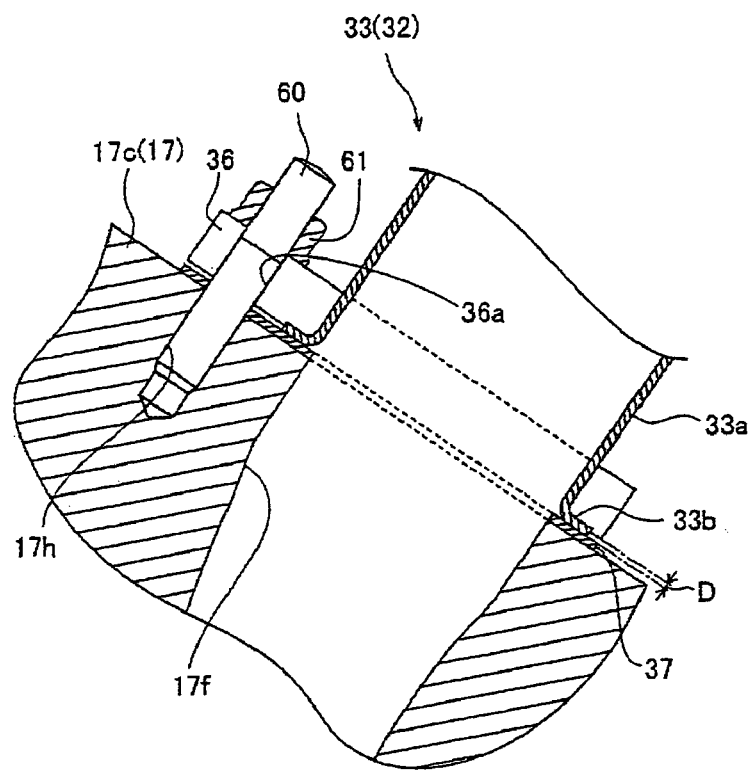
FIG. 7 is a cross sectional view showing a state of connection of an engine and the exhaust pipe of the motorcycle shown in FIG. 1.
Figure 8:
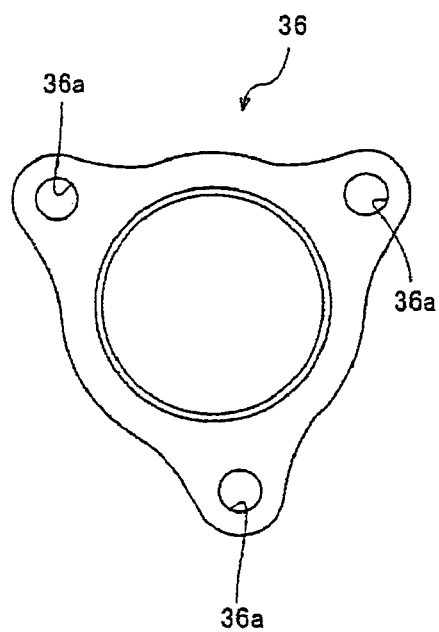
FIG. 8 is a plan view showing the construction of a flange of the motorcycle shown in FIG. 1.

The engine connection 33 of the exhaust pipe 32 is connected to the cylinder head portion 17c through a flange 36 as shown in FIGS. 1 and 2. Specifically, as shown in FIG. 7, the flange 36 is mounted to the engine connection 33 and the engine connection 33 is fixed to the cylinder head portion 17c by coupling nuts 61 to stud bolts 60 that are inserted into threaded holes 17h of the cylinder head portion 17c and screw insertion holes 36a of the flange 36. As shown in FIG. 8, the flange 36 may include three screw insertion holes 36a and the stud bolts 60 (see FIG. 7) may be inserted into the three screw insertion holes 36a, respectively, whereby the engine connection 33 (see FIG. 7) are further firmly fixed to the cylinder head portion 17c (see FIG. 7). Also, as shown in FIG. 7, a gasket 37 for ensuring the air tightness between the engine 17 and the exhaust pipe 32 is provided between the flange 36 and the cylinder head portion 17c. Also, the front end 33a of the engine connection 33 is shaped to be folded outward, and a folded portion 33b of the front end 33a and the gasket 37 come into surface contact with each other. A predetermined spacing D is provided between the flange 36 and the gasket 37 to eliminate contact between the flange 36 and the gasket 37. The flange 36 increases contact pressure between the folded portion 33b of the engine connection 33 and the gasket 37 since the folded portion 33b of the engine connection 33 is pushed against the gasket 37 by clamping the nuts 61; As shown in FIG. 4, when the engine connection 33 is mounted to the engine 17, a rear end 33c of the engine connection 33 is positioned rearward with respect to a portion of the rear suspension 24 that intersects with the engine connection 33.

Figure 9:
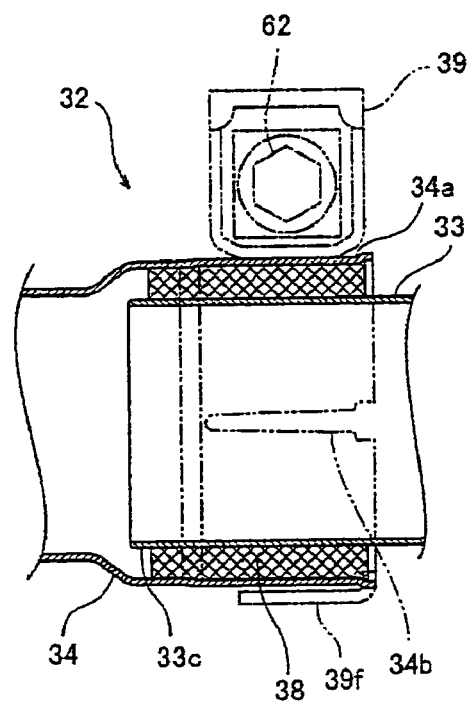
FIG. 9 is a cross sectional view showing a state of connection of an engine connection of the exhaust pipe and a coil-shaped portion of the motorcycle shown in FIG. 1.

As shown in FIG. 9, the engine connection 33 is connected to the coil-shaped portion 34 through a gasket 38. Specifically, a front end 34a of the coil shaped portion 34 is larger in outside diameter than the remaining portion of the coil-shaped portion 34, and the rear end 33c of the engine connection 33 is inserted into the front end 34 through the gasket 38. Also, as shown in FIG. 4, a connecting portion between the engine connection 33 and the coil-shaped portion 34 is positioned below the subtank portion 24b of the rear suspension 24. Also, the engine connection 33 and the coil-shaped portion 34 are clamped by a band member 39 in a state in which the rear end 33c of the engine connection 33 and the gasket 38 are inserted into the front end 34a of the coil-shaped portion 34, to be thereby fixed as shown in FIG. 9. In addition, the band member 39 may be referred to as a "clamp member."

Figure 10:
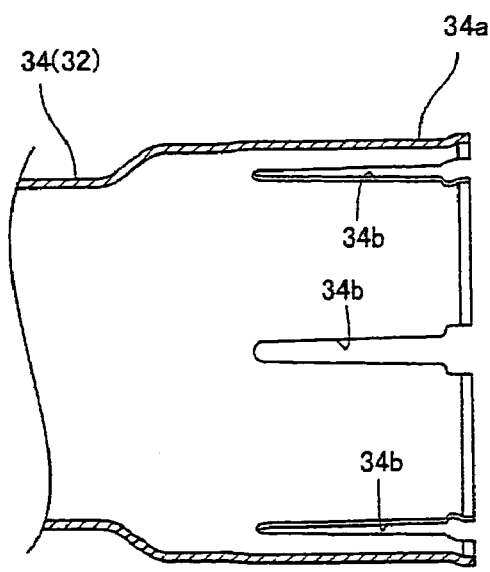
FIG. 10 is a cross sectional view showing the construction of a front end of the coil-shaped portion of the exhaust pipe of the motorcycle shown in FIG. 1.

Also, six slits 34b are provided at equal intervals on the front end 34a of the coil-shaped portion 34 as shown in FIGS. 9 and 10. By forming the six slits 34b on the front end 34a of the coil-shaped portion 34', the rear end 33c (see FIG. 9) of the engine connection 33 (see FIG. 9) and the gasket 38 (see FIG. 9) can be inserted more easily. Also, as shown in FIG. 9, owing to clamping by the band member 39 in a state in which the rear end 33c of the engine connection 33 and the gasket 38 are inserted into the front end 34a of the coil-shaped portion 34, the respective slits 34b are decreased in width, so that the front end 34a of the coil-shaped portion 34 is decreased in diameter. Thereby, the engine connection 33 (see FIG. 5) and the coil-shaped portion 34 (see FIG. 5) are further firmly fixed together.

Figure 11:
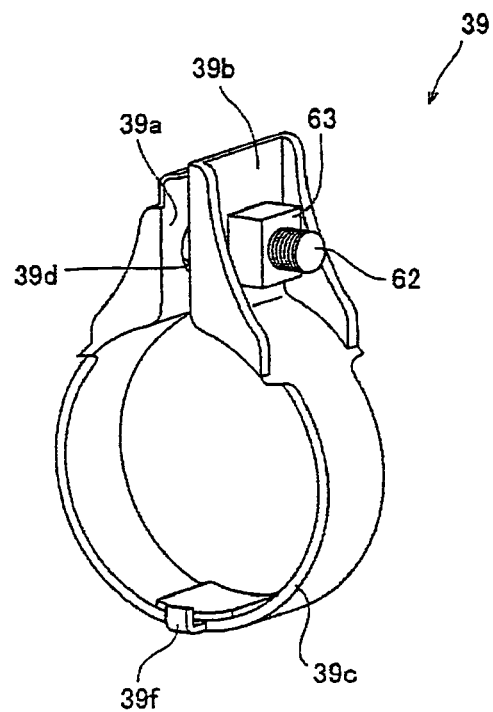
FIG. 11 is a perspective view showing the construction of a band member of the motorcycle shown in FIG. 1.
Figure 12:
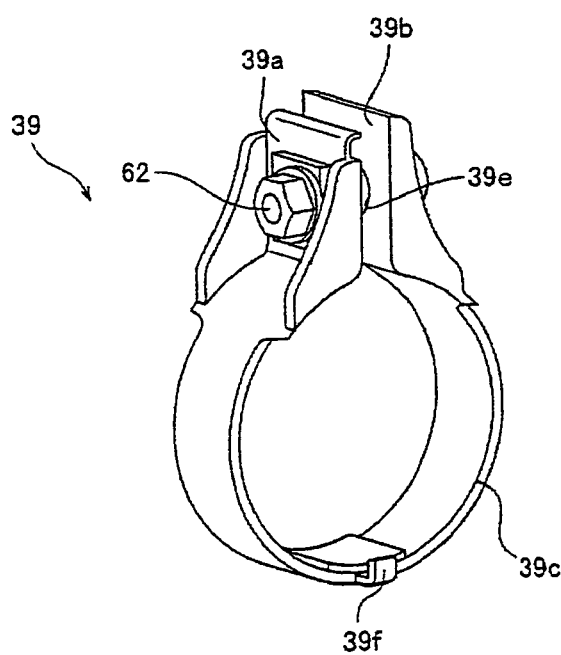
FIG. 12 is a perspective view showing the construction of the band member of the motorcycle shown in FIG. 1.

Also, as shown in FIGS. 11 and 12, the band member 39 includes two wall portions 39a and 39b, which faces each other, and an annular portion 39c connecting the two wall portions 39a and 39b together. The wall portions 39a and 39b, respectively, include a screw insertion hole 39d (see FIG. 11) and a screw insertion hole 39e (see FIG. 12). Also, a bolt 62 is inserted, from a side of the wall portion 39a, into the screw insertion holes 39d (see FIG. 11) and 39e (see FIG. 12), and is threaded by a nut 63 (see FIG. 11) that is provided on a side of the wall portion 39b. Thereby, the band member 39 allows the wall portions 39a and 39b to approach each other, thereby decreasing the inside diameter of the annular portion 39c. The annular portion 39c may be further provided with a pawl portion 39f.

As shown in FIG. 1, the coil-shaped portion 34 is provided rearward from the rear suspension 24 and forward from the rear wheel 25. Also, the coil-shaped portion 34 is provided rearward from the fuel tank 30. Thereby, the fuel tank 30 can be inhibited from being provided above both the rear suspension 24 and the coil-shaped portion 34, so that it is possible to inhibit the fuel tank 30 from being made too high in a height direction of the motorcycle 1. Also, the coil-shaped portion 34 is provided rearwardly downward from a center portion of the seat 31 and below a corresponding, upper surface portion of the seat rail 7. Also, the coil-shaped portion 34 is coil-shaped. As shown in FIG. 6, the coil-shaped portion 34, taken from its plan view, diverges in the vehicle width direction, and, as shown in FIG. 5, the coil-shaped portion 34, taken from its left side view, diverges vertically. Also, as shown in FIG. 1, the coil-shaped portion 34 is curved rearwardly upward from the rear suspension 24 and formed to be curved upward while inclining rearward so that the upwardly curved portion does not interfere with the subtank portion 24b of the rear suspension 24.

Figure 13:
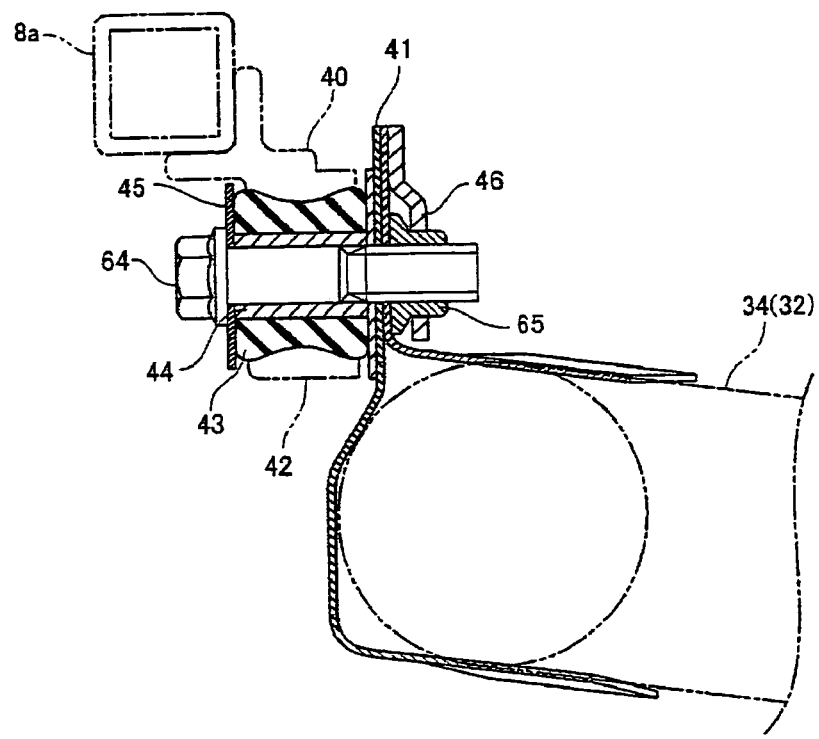
FIG. 13 is a cross sectional view showing the construction, in which the coil-shaped portion of the exhaust pipe of the motorcycle shown in FIG. 1 is supported on a left stay.

As shown in FIG. 4, the left stay 8a supports a portion of the coil-shaped portion 34 that extends downward from above while curving in the vehicle width direction. Specifically, a support portion 40 is provided on the left stay 8a to project rearwardly downward. Also, as shown in FIGS. 5 and 6, a band-shaped-stay 41 mounted to the coil-shaped portion 34 in a manner to surround an outer periphery of the coil-shaped portion 34. As shown in FIG. 13, a collar 42 is provided integrally with the support portion 40 shown in FIG. 4 and a damper 43 is embedded into the collar 42. The damper 43 may be formed of rubber and in a tubular shape. The damper 43 attenuates vibrations transmitted to the coil-shaped portion 34 in traveling. The damper 43 may be referred to as a "cushioning member." A further collar 44 is provided in the tubular damper 43, and the damper 43 is interposed by the collar 44 and a washer 45. A bolt 64 inserted into the washer 45, the collar 44, and a screw insertion hole 41a of the stay 41, respectively, is threaded into a nut 65 whereby the stay 41 is supported on the left stay 8a. Also, a positioning plate 46 is mounted to the stay 41 by welding for positioning the nut 65.

Figure 14:
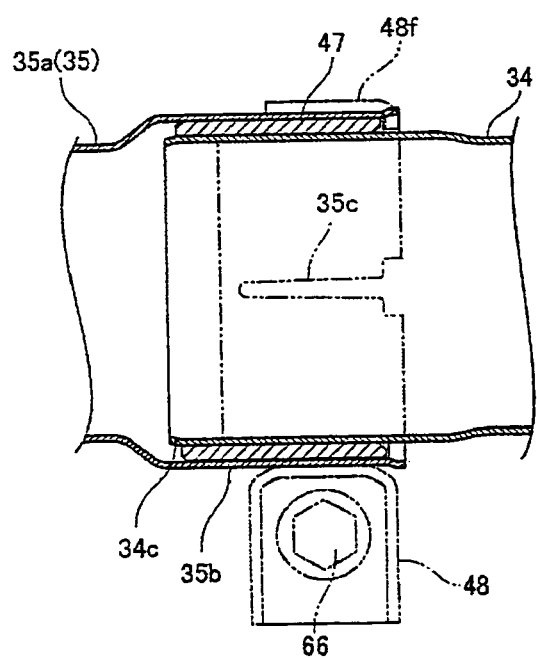
FIG. 14 is a cross sectional view showing a state, in which the coil-shaped portion of the exhaust pipe of the motorcycle shown in FIG. 1 is connected to a connecting pipe of a muffler.

As shown in FIGS. 5 and 6, the coil-shaped portion 34 is connected to a connecting pipe 35a of the muffler 35 at the rear end 34c thereof. Specifically, as shown in FIG. 14, the connecting pipe 35a of the muffler 35 is formed so that an end 35b is larger in outside diameter than the remaining portion of the connecting pipe 35a, and the rear end 34c of the coil-shaped portion 34 to be connected to the connecting pipe 35a of the muffler 35 is inserted into the end 35b through a gasket 47. Also, the coil-shaped portion 34 and the connecting pipe 35a of the muffler 35 are clamped by a band member 48 in a state in which the rear end 34c of the coil-shaped portion 34 is inserted into the connecting pipe 35a, to be thereby fixed.

Figure 15:
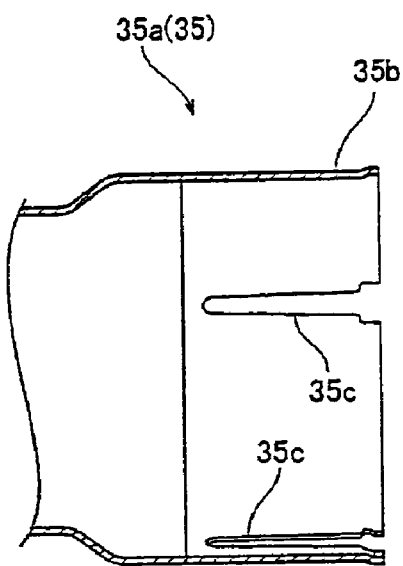
FIG. 15 is a view showing the construction of a front end of the connecting pipe of the muffler of the motorcycle shown in FIG. 1.
Figure 16:
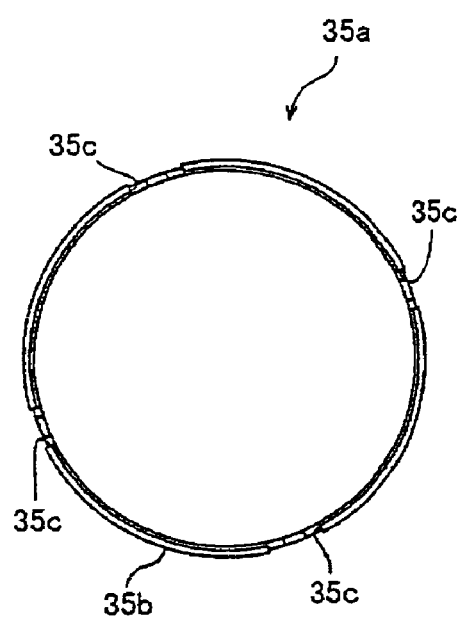
FIG. 16 is a view showing the construction of the front end of the connecting pipe of the muffler of the motorcycle shown in FIG. 1.

As shown in FIG. 15, slits 35c are formed on the connecting pipe 35a of the muffler 35 in a longitudinal direction. Four slits 35c may be formed at intervals of about 90° as shown in FIG. 16. The four slits 35c are formed at the end 35b of the connecting pipe 35a whereby insertion of the rear end 34c (see FIG. 14) of the coil-shaped portion 34 (see FIG. 14) and the gasket 47 (see FIG. 14) can be facilitated. Also, as shown in FIG. 14, owing to clamping by the band member 48 in a state in which the rear end 34c of the coil-shaped portion 34 and the gasket 47 are inserted into the end 35b of the connecting pipe 35a, the respective slits 35c are decreased in width, so that the end 35b of the connecting pipe 35a is decreased in diameter. Thereby, the coil-shaped portion 34 (see FIG. 5) and the connecting pipe 35a (see FIG. 5) are further firmly fixed together.

Figure 17:
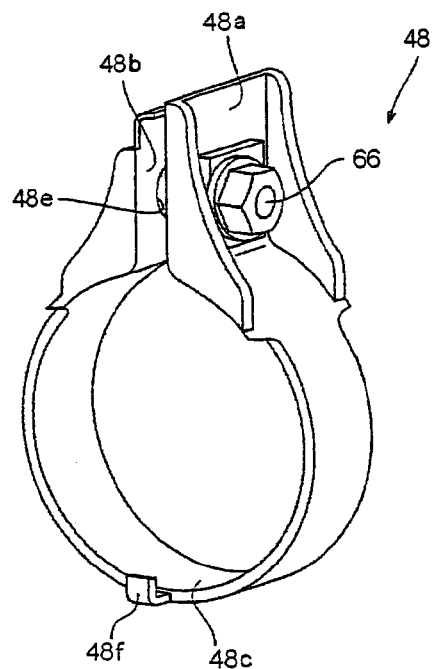
FIG. 17 is a perspective view showing the construction of the band member of the motorcycle shown in FIG. 1.
Figure 18:
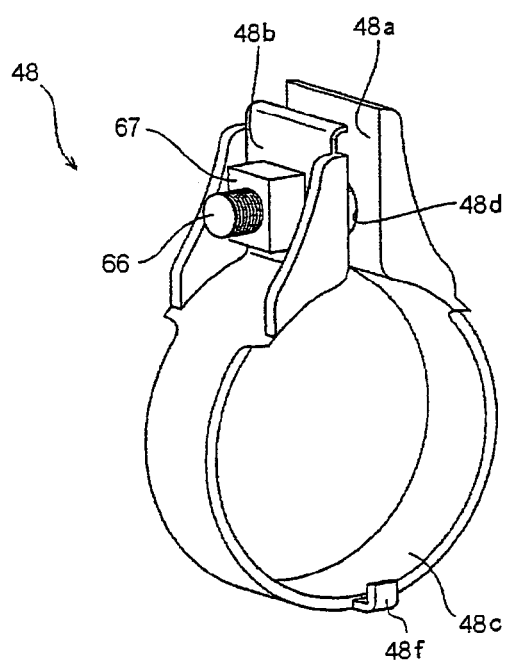
FIG. 18 is a perspective view showing the construction of the band member of the motorcycle shown in FIG. 1.

Also, as shown in FIGS. 17 and 18, the band member 48 includes two wall portions 48a and 48b, which faces each other, and an annular portion 48c connecting the two wall portion 48a and 48b together. The wall portions 48a and 48b, respectively, include a screw insertion hole 48d (see FIG. 18) and a screw insertion hole 48e (see FIG. 17). A bolt 66 is inserted into the screw insertion holes 48d (see FIG. 18) and 48e (see FIG. 17), respectively, and threaded by a nut 67 (see FIG. 18) on a side of the wall portion 48b. Thereby, the band member 48 allows the wall portions 48a and 48b to approach each other, thereby decreasing the inside diameter of the annular portion 48c. The annular portion 48c may be further provided with a pawl portion 48f.

Also, as shown in FIGS. 5 and 6, the muffler 35 includes the connecting pipe 35a connected to the coil-shaped portion 34 and a silencer portion 35d that reduces noise. Two mounts 35e and 35f spaced at a predetermined interval in a longitudinal direction are mounted to an upper surface portion of the silencer portion 35d as shown in FIG. 5. As shown in FIG. 3, the mount 35e together with a support (not shown) provided on the right stay 8b is clamped by a bolt 68 to be thereby fixed to the right stay 8b. Also, the mount 35f together with a support (not shown) provided on the right rail 7b is clamped by a bolt 69 to be thereby fixed to the right rail 7b.

As shown in FIGS. 5 and 6, a tank portion 49 is provided on the engine connection 33 of the exhaust pipe 32. The tank portion 49 permits exhaust gases from the engine 17 (see FIG. 1) to flow thereinto and reduces noise. The tank portion 49 is connected to the engine connection 33, and is positioned forward from the rear suspension 24 and upward from the crank case portion 17a as shown in FIG. 1.

FIGS. 19 to 23 illustrate the process of assembling the rear suspension, the exhaust pipe, and the muffler of the motorcycle according to the first exemplary embodiment. Subsequently, the process of assembling the rear suspension 24, the exhaust pipe 32, and the muffler 35 of the motorcycle 1 according to the first exemplary embodiment will be described with reference to FIGS. 19 to 23.

Figure 19:
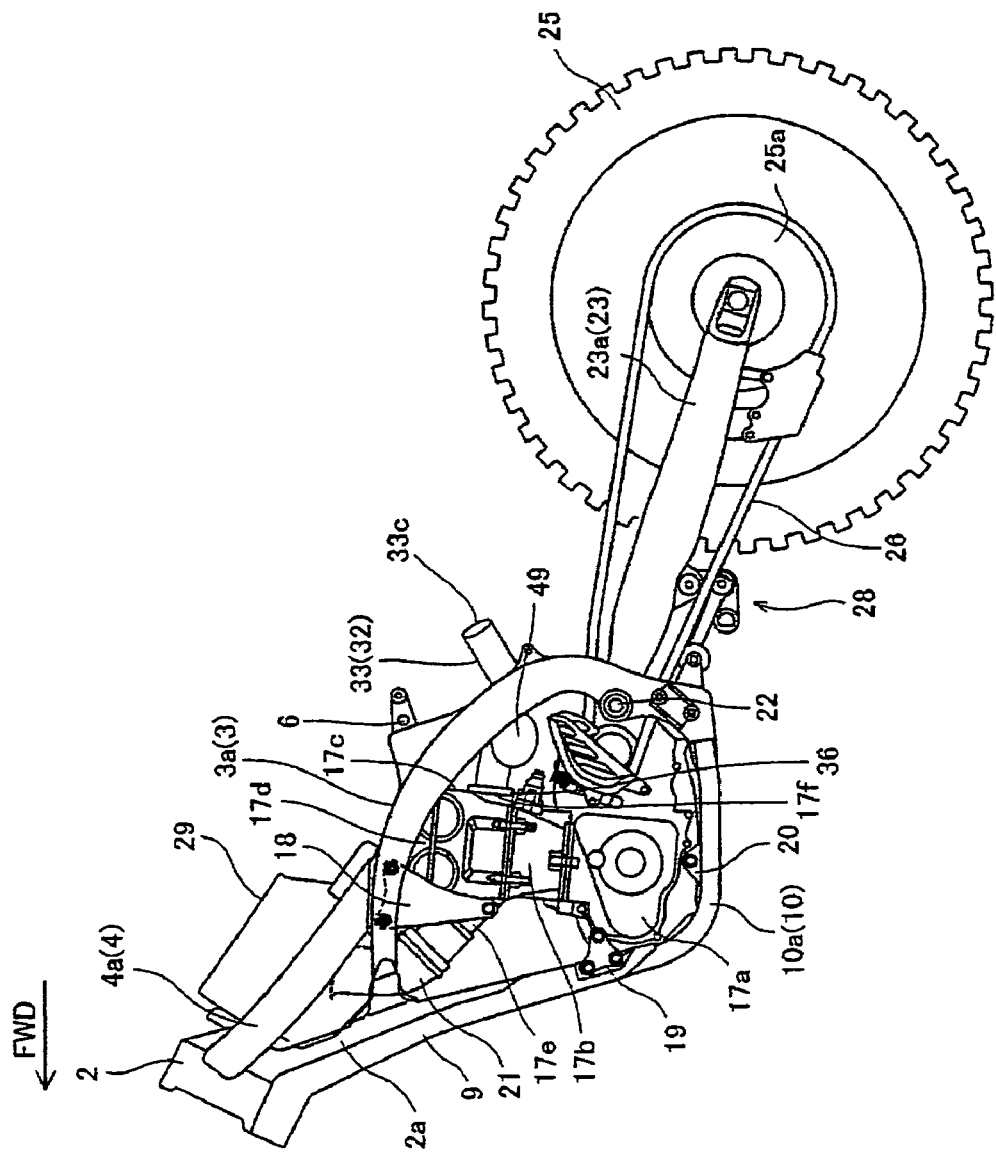
FIG. 19 is a view showing the assembling process of a rear suspension and an exhaust pipe of the motorcycle according to the first exemplary embodiment of the invention.

First, as shown in FIG. 19, the engine connection 33 of the exhaust pipe 32 is mounted to the cylinder head portion 17c of the engine 17 through the flange 36 as shown in FIG. 19.

Figure 20:
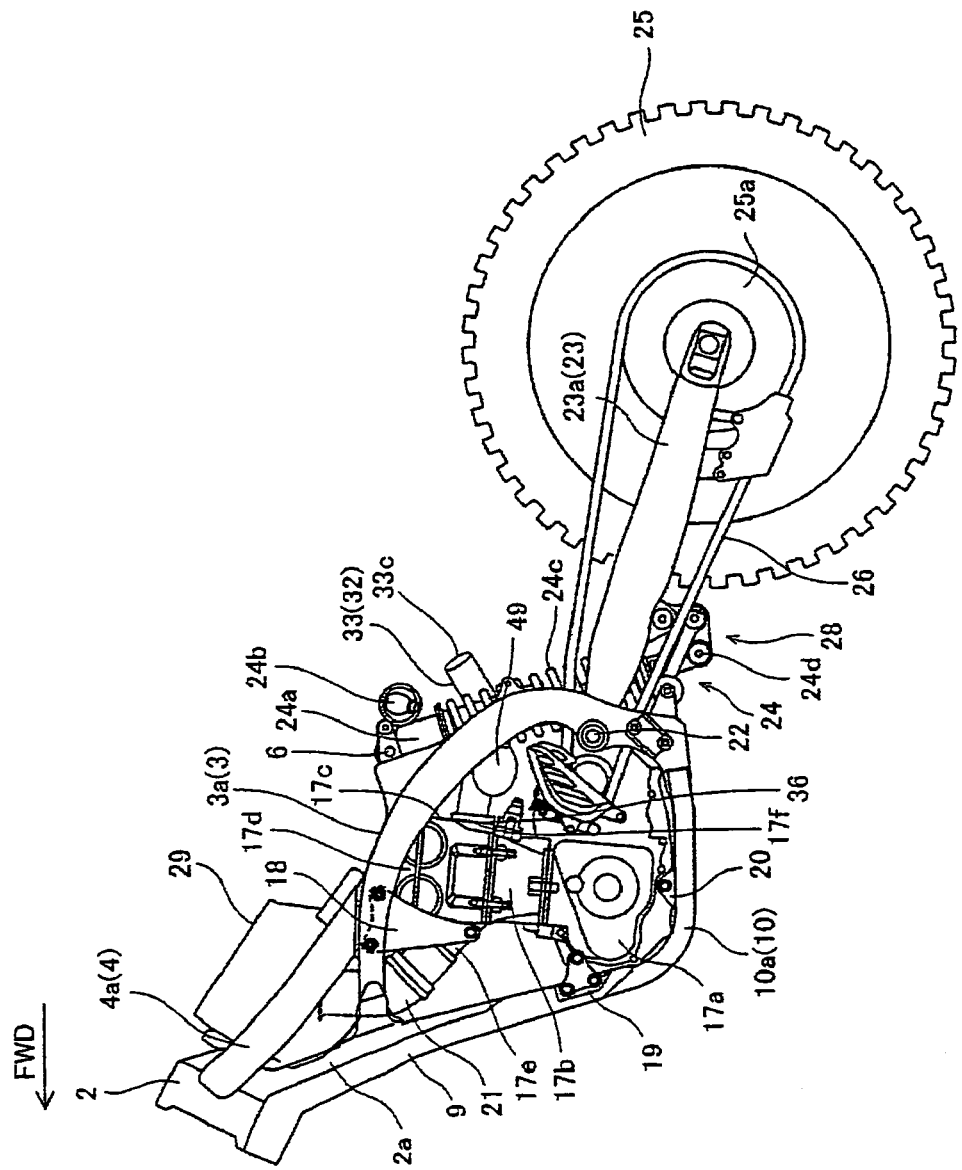
FIG. 20 is a view showing the assembling process of the rear suspension and the exhaust pipe of the motorcycle according to the first exemplary embodiment of the invention.

Subsequently, as shown in FIG. 20, the rear suspension 24 is mounted to the support 6. At this time, the rear suspension 24 is provided to intersect the engine connection 33 of the exhaust pipe 32 as viewed from laterally. And a portion of the rear suspension 24 that is disposed on the same height of the rear end 33c is disposed forward from the rear end 33c.

Figure 21:
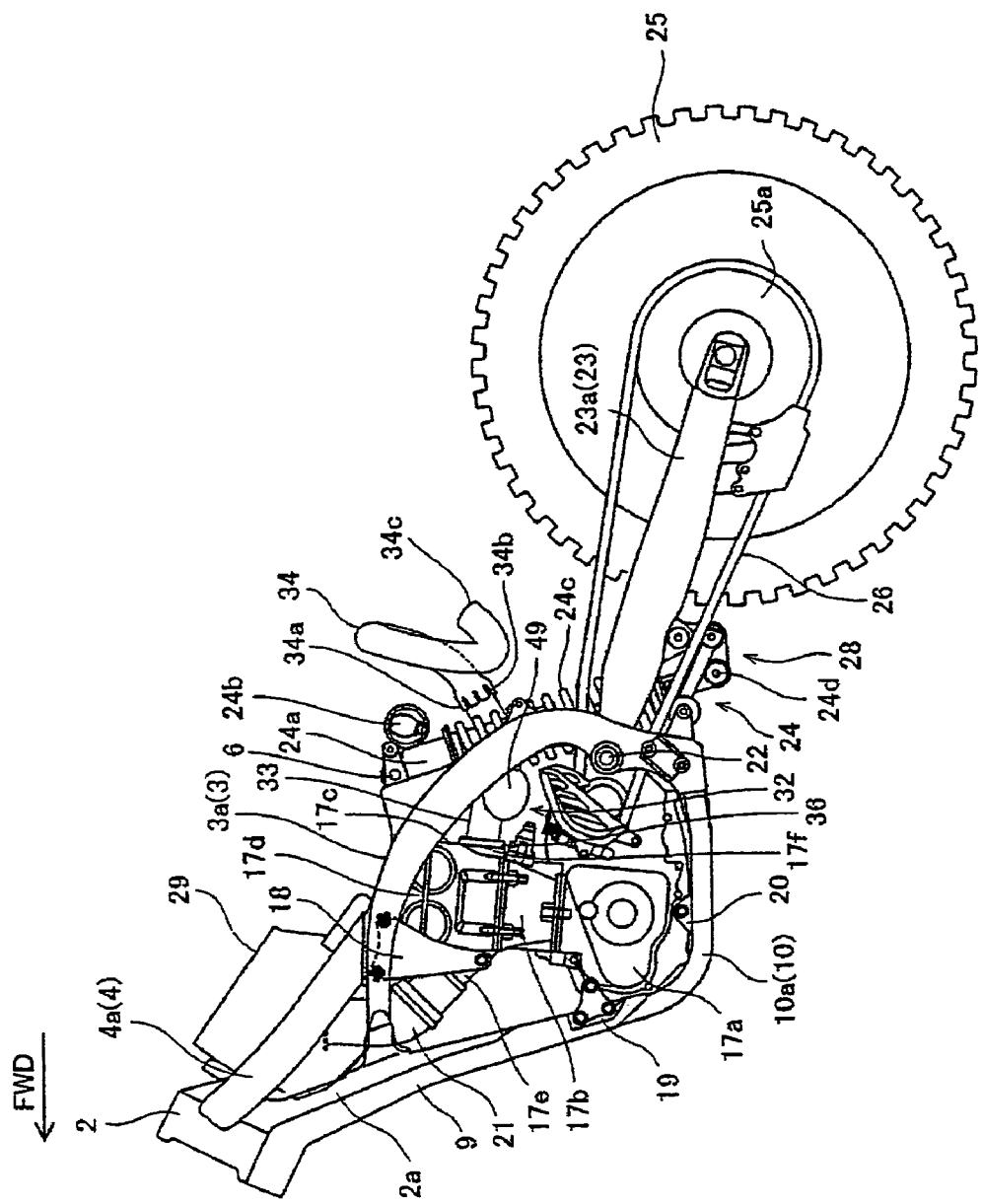
FIG. 21 is a view showing the assembling process of the rear suspension and the exhaust pipe of the motorcycle according to the first exemplary embodiment of the invention.

Then, as shown in FIG. 21, the coil-shaped portion 34 is connected to the engine connection 33. Specifically, the rear end 33c (see FIG. 20) of the engine connection 33 positioned rearward from the rear suspension 24 is inserted into the front end 34a of the coil-shaped portion 34. Because the exhaust pipe 32 is divided into the engine connection 33 and the coil-shaped portion 34, the assembling work can be performed in the order of the engine connection 33, the rear suspension 24, and the coil-shaped portion 34, thereby preventing the assembling process of the exhaust pipe 32 and the rear suspension 24 from becoming complex.

Figure 22:
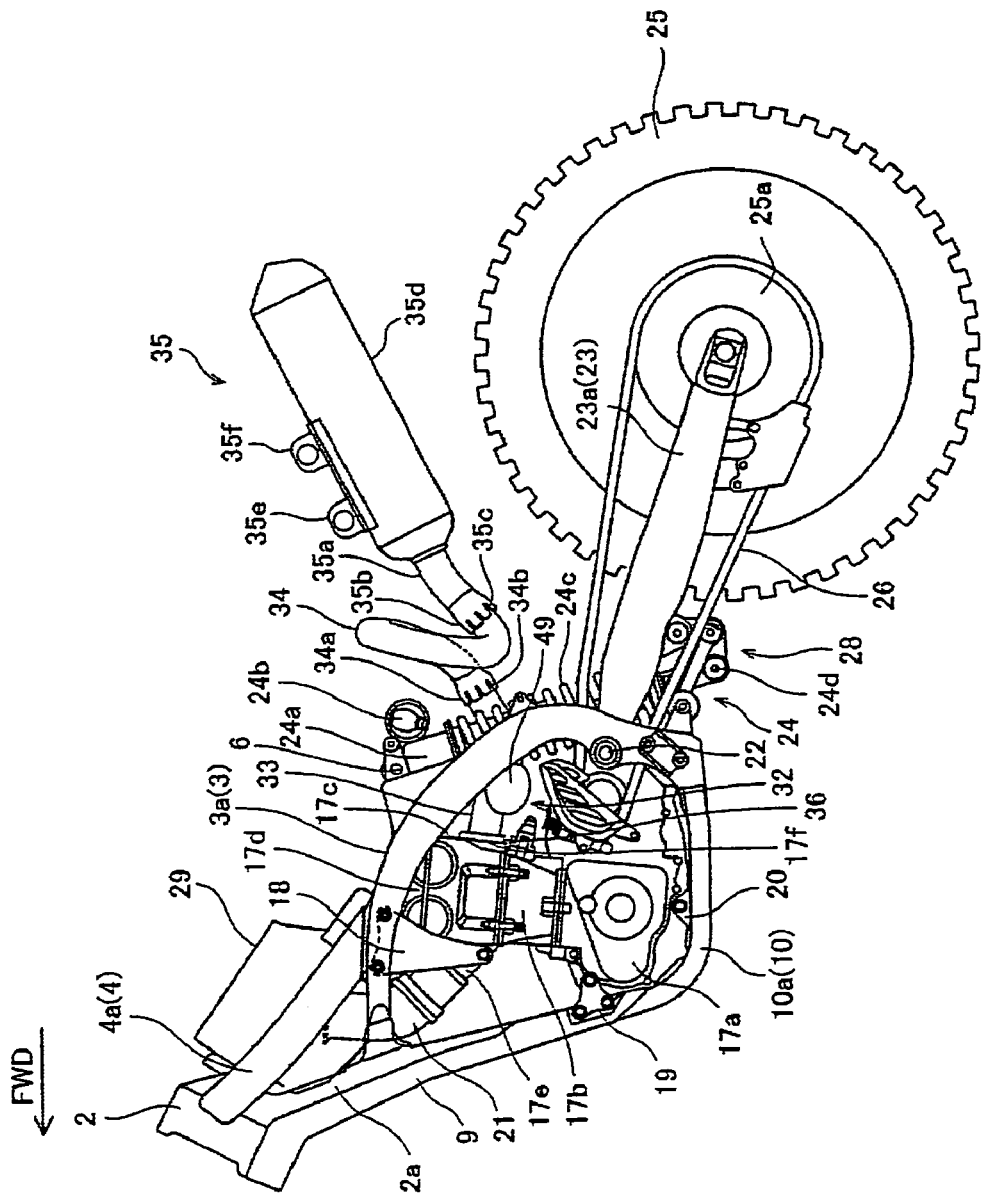
FIG. 22 is a view showing the assembling process of the rear suspension, the exhaust pipe, and the muffler of the motorcycle according to the first exemplary embodiment of the invention.

Subsequently, as shown in FIG. 22, the muffler 35 is connected to the coil-shaped portion 34 of the exhaust pipe 32. Specifically, the rear end 34c (see FIG. 21) of the coil-shaped portion 34 is inserted into the connecting pipe 35a of the muffler 35.

Figure 23:
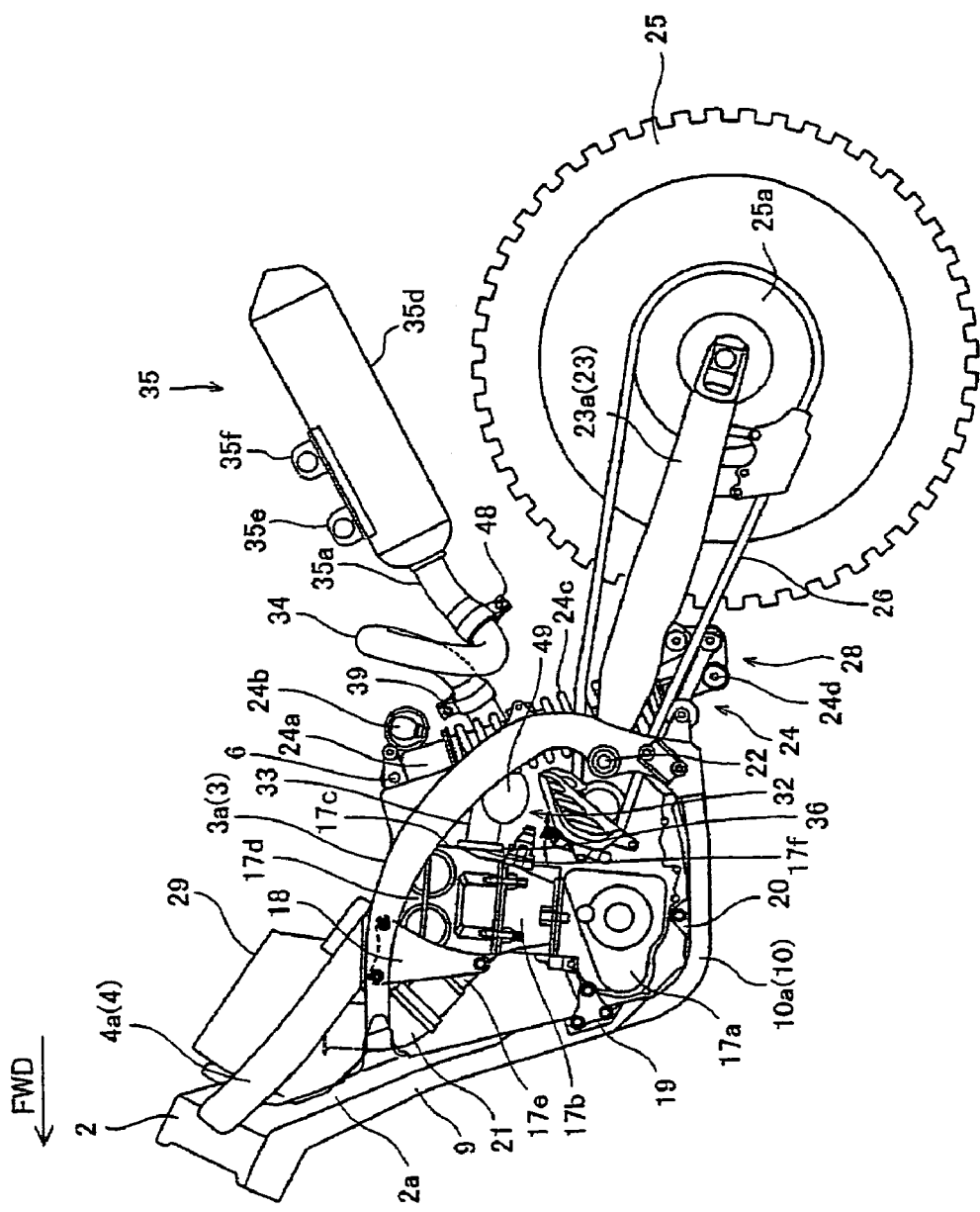
FIG. 23 is a view showing the assembling process of the rear suspension, the exhaust pipe, and the muffler of the motorcycle according to the first exemplary embodiment of the invention.

Thereafter, as shown in FIG. 23, the two band members 39 and 48 are respectively mounted. That is, the band member 39 is mounted to a connection between the engine connection 33 and the coil-shaped portion 34, and the band member 48 is mounted to a connection between the coil-shaped portion 34 and the connecting pipe 35a of the muffler 35. In this manner, assembling of the exhaust pipe 32 (the engine connection 33 and the coil-shaped portion 34), the rear suspension 24, and the muffler 35 is completed.

In the first exemplary embodiment, the coil-shaped portion 34 of the exhaust pipe 32 can be provided rearward from the rear suspension 24, thereby preventing the coil-shaped portion 34 of the exhaust pipe 32 from being provided above the rear suspension 24. Thereby, it is possible to prevent the fuel tank 30 and the seat 31, which are provided above the rear suspension 24, from being disposed too high in a height direction of the motorcycle 1. Also, by forming the coil-shaped portion 34 as a portion of the exhaust pipe 32, it is possible to sufficiently ensure a length of the exhaust pipe 32. Also, by allowing the exhaust pipe 32 to be divided into the engine connection 33 and the coil-shaped portion 34, the rear suspension 24 can be mounted, before the coil-shaped portion 34 is connected to the engine connection 33, in a state in which the engine connection 33 is mounted to the rear portion of the cylinder head portion 17c. Accordingly, the process of assembling the exhaust pipe 32 and the rear suspension 24 can be simplified more than when the engine connection 33 and the coil-shaped portion 34 are formed integrally.

In the first exemplary embodiment, the engine connection 33 of the exhaust pipe 32 and the rear suspension 24 are provided to intersect each other as viewed from laterally and the rear end 33c of the engine connection 33 is provided rearward from the rear suspension 24 in the vicinity of a position, in which the engine connection 33 and the rear suspension 24 intersect each other. Thus, the rear end 33c of the engine connection 33, to which the coil-shaped portion 34 is connected, can be provided rearward from the rear suspension 24 in a state in which the engine connection 33 and the rear suspension 24 are mounted. Thereby, the coil-shaped portion 34 can be mounted to the engine connection 33 more easily in a state, in which the engine connection 33 and the rear suspension 24 are assembled.

In the first exemplary embodiment, the coil-shaped portion 34 of the exhaust pipe 32 is coil-shaped to diverge in the vehicle width direction as viewed in a plan view and to diverge vertically as viewed from laterally, whereby increasing the length of the exhaust pipe 32.

In the first exemplary embodiment, by providing the band member 39 connecting the engine connection 33 of the exhaust pipe 32 and the coil-shaped portion 34, it is possible to readily divide the engine connection 33 and the coil-shaped portion 34 differently from the case where the engine connection 33 and the coil-shaped portion 34 are connected to each other by welding. Thereby, it is possible to improve the exhaust pipe 32 in quality of maintenance.

In the first exemplary embodiment, the coil-shaped portion 34 is fixed to the left stay 8a whereby it is possible to readily fix the coil-shaped portion 34 to be positioned rearward from the exhaust pipe 32.

In the first exemplary embodiment, the coil-shaped portion 34 is fixed to the left stay 8a through the damper 43 whereby it is possible to attenuate vibrations transmitted to the coil-shaped portion 34 in traveling of the motorcycle 1.

In the first exemplary embodiment, the connecting portion between the engine connection 33 and the coil-shaped portion 34 is provided below the subtank portion 24b that extends in the vehicle width direction, whereby it is possible to prevent a lower end of the subtank portion 24b from coming too close to the connecting portion between the coil-shaped portion 34 and the engine connection 33, allowing the coil-shaped portion 34 to be mounted to the engine connection 33 more easily.

In the first exemplary embodiment, by providing the tank portion 49 having the function of noise reduction and connected to the engine connection 33 of the exhaust pipe 32 to permit exhaust gases from the engine 17 to flow thereinto, it is possible to reduce exhaust noise of exhaust gases from the engine 17. Also, by connecting the tank portion 49 to the engine connection 33, it is possible to provide the tank portion 49 in a position further close to the engine 17, so that it is possible to further effectively reduce exhaust noise of exhaust gases when exhausted into the exhaust pipe 32 from the engine 17.

In the first exemplary embodiment, because the coil-shaped portion 34 is provided rearward from the fuel tank 30, the fuel tank 30 is prevented from being provided above the coil-shaped portion 34 that is wound vertically as viewed from laterally. Accordingly, it is possible to prevent the fuel tank 30 from being disposed too high in a height direction of the motorcycle 1.

Figure 24:
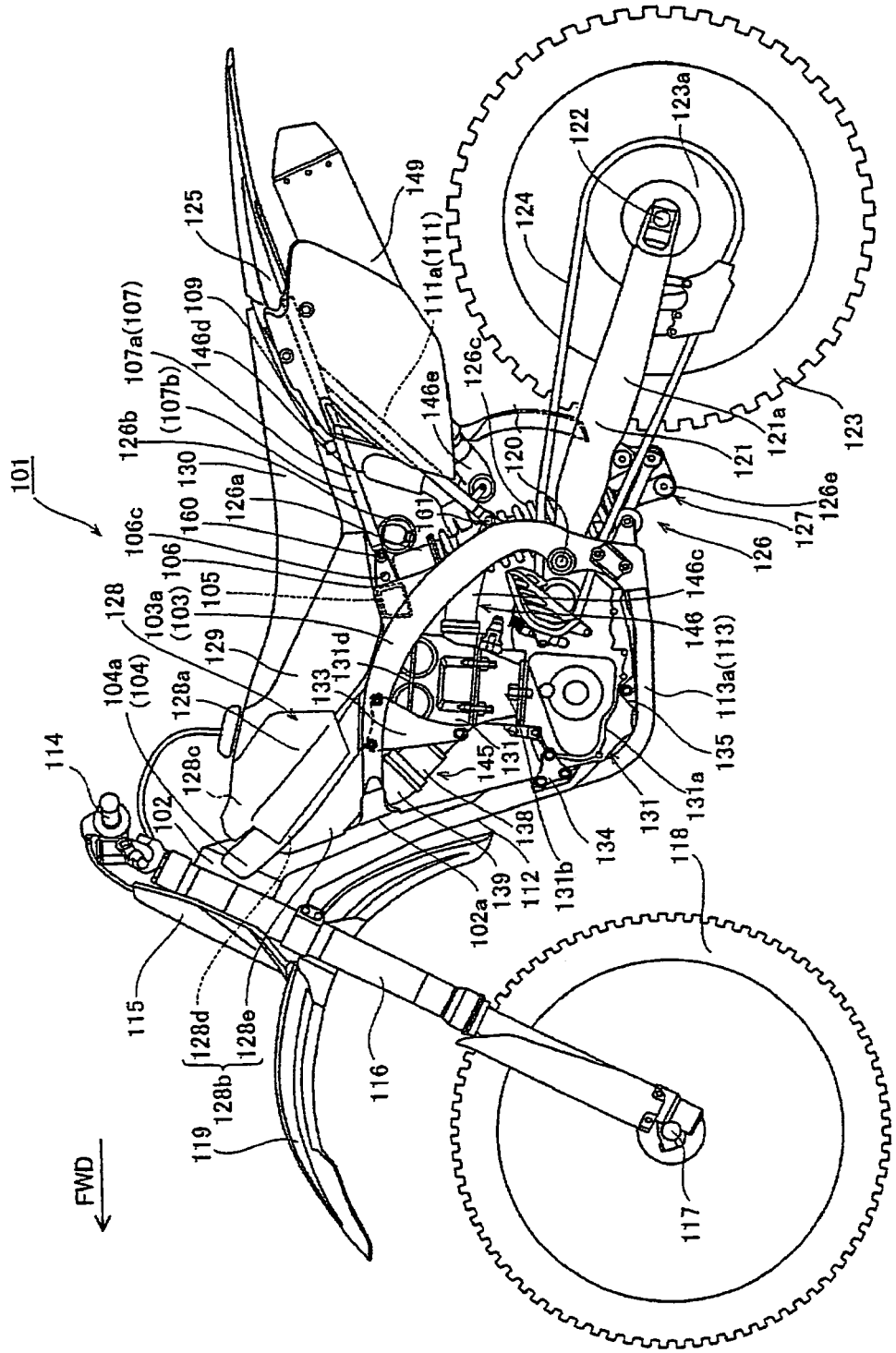
FIG. 24 is a side view showing a whole construction of a motorcycle according to a second exemplary embodiment of the invention.
Figure 25:
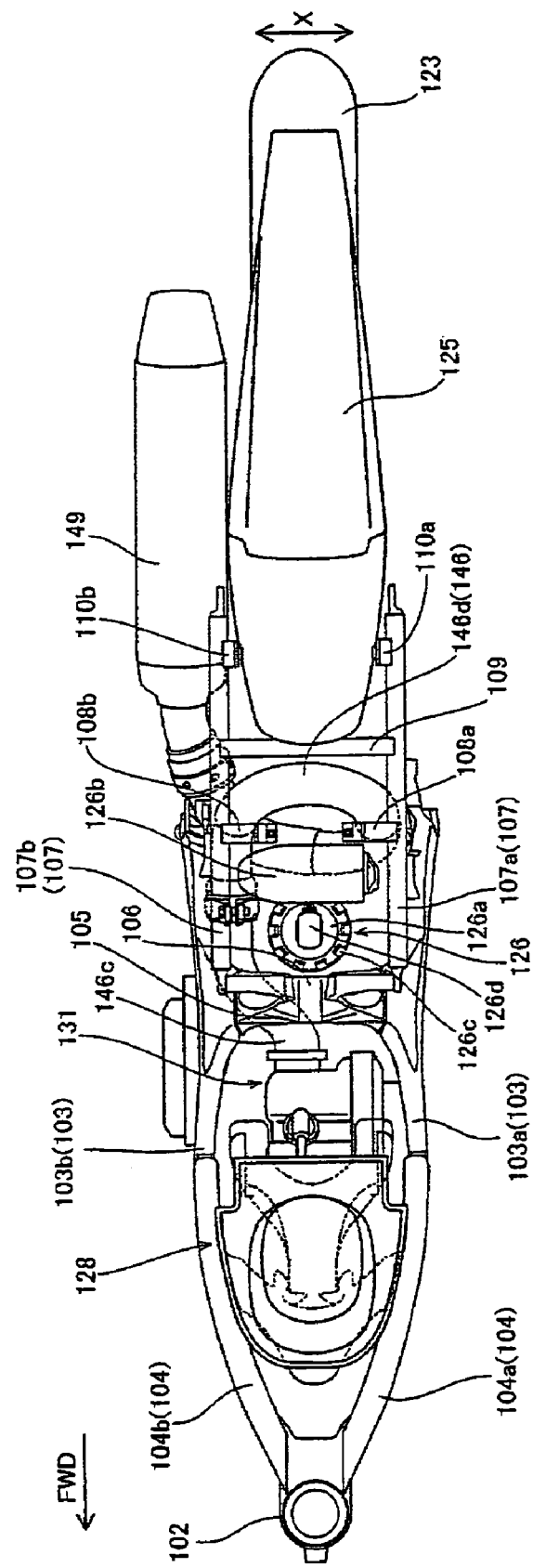
FIG. 25 is a plan view showing the motorcycle shown in FIG. 24.

FIG. 24 is a side view showing a whole construction of a motorcycle according to a second exemplary embodiment of the invention. FIGS. 25 to 31 illustrate a construction of the motorcycle shown in FIG. 24. In the drawings, the FWD arrow indicates a forward direction in which the motorcycle runs. Further, any reference to a front and rear of the vehicle will be used in the usual and customary manner. Moreover, any reference to the vehicle width direction will be taken to mean in a direction perpendicular to the FWD arrow, and in the direction of the arrow X, as shown in FIG. 25. Additionally when reference is made to right side of the vehicle, this is taken to mean the right side of the vehicle relative to the FWD. The left side will be the side opposite to the right side. The construction of a motorcycle 101 according to the second exemplary embodiment of the invention will be described with reference to FIGS. 24 to 31. Differently from the first exemplary embodiment, the second exemplary embodiment will be described with respect to an example, in which a distance between a left rail 107a and a right rail 107b is larger than a length of a rear suspension 126 including a subtank portion 126b in a vehicle width direction.

Figure 26:
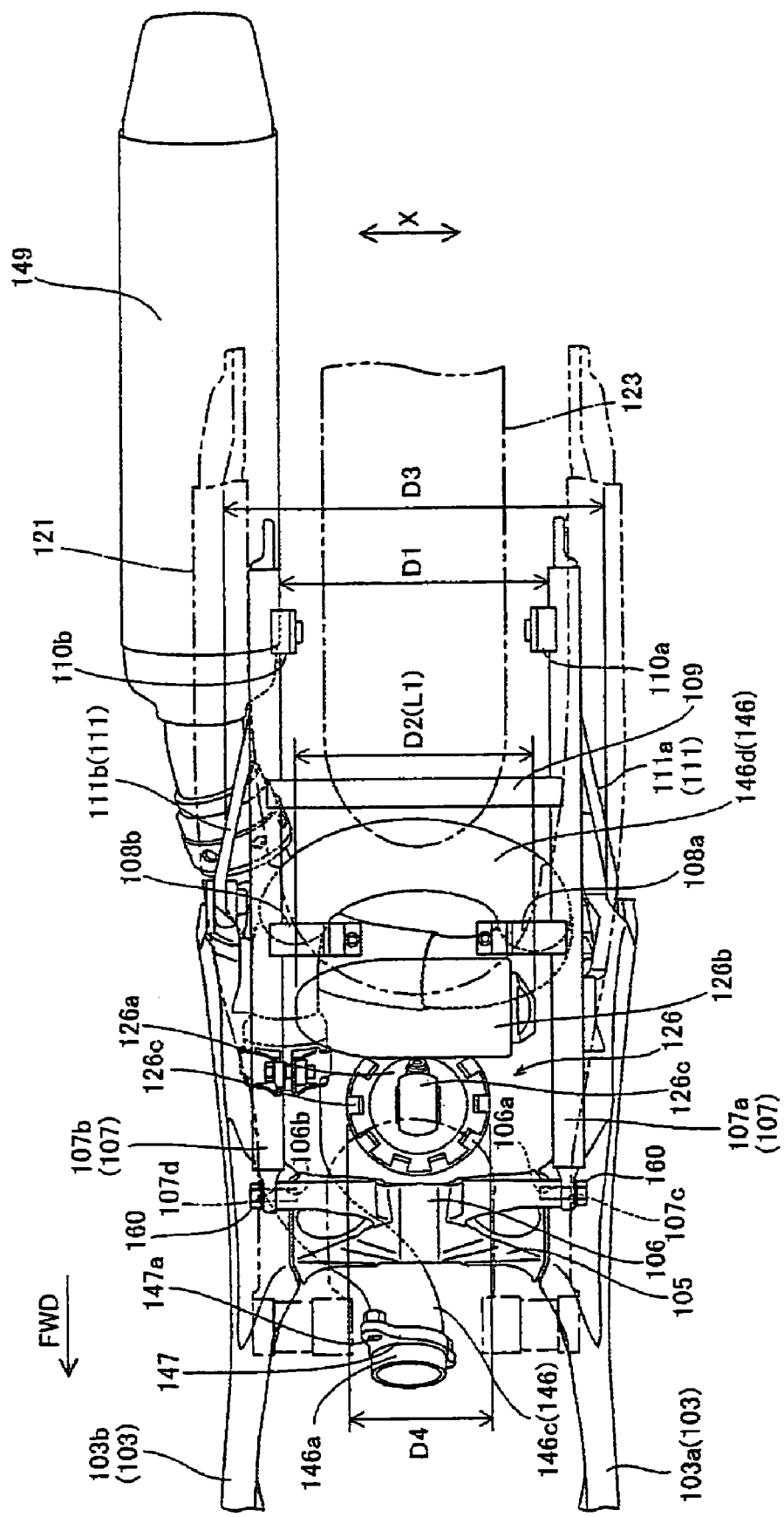
FIG. 26 is an enlarged, plan view showing the motorcycle shown in FIG. 24.

In the whole construction of the motorcycle 101 according to the second exemplary embodiment of the invention, a left frame 103a and a right frame 103b (see FIG. 25) of a main frame 103 are connected to a connection 102a that extends rearward below a head pipe 102 as shown in FIG. 24. The left frame 103a and the right frame 103b of the main frame 103 respectively extend rearwardly downward from the connection 102a. Also, the motorcycle further includes a tank rail 104 that has a left tank rail 104a and a right tank rail 104b (see FIG. 25). The left tank rail 104a is provided between a rear portion of the head pipe 102 and an upper portion of the left frame 103a, and the right tank rail 104b is provided between the rear portion of the head pipe 102 and an upper portion of the right frame 103b. A front portion of a fuel tank 129, which will described later in more detail, is provided on the pair of tank rails 104. Also, as shown in FIGS. 25 and 26, a connecting member 105 connects a rear, upper portion of the left frame 103a and a rear, upper portion of the right frame 103b. A support 106 is formed integrally with the connecting member 105. Connected to the support 106 are a left rail 107a and a right rail 107b, which extend rearwardly upward from the support 106. The left rail 107a and the right rail 107b constitute a seat rail 107.

As shown in FIG. 26, screw insertion holes 107c and 107d are formed at respective front ends of the left rail 107a and the right rail 107b. Also, threaded holes 106a and 106b are formed on the support 106 to correspond to the screw insertion holes 107c and 107d, respectively. The left rail 107a is screwed to the threaded hole 106a through the screw insertion hole 107c by a screw 160 to be fixed to the left side of the support 106. Also, the right rail 107b is screwed to the threaded hole 106b through the screw insertion hole 107d by the screw 160 to be fixed to the right side of the support 106. In this manner, the seat rail 107 is mounted to the connecting member 105.

Here, the left rail 107a and the right rail 107b extend substantially in parallel to each other in a longitudinal direction. Also, the left rail 107a and the right rail 107b are provided with a predetermined spacing D1 therebetween in the vehicle width direction. The predetermined spacing D1 is made larger than a length D2 of the rear suspension 126 in the vehicle width direction. That is, the rear suspension 126 is inserted from between the left rail 107a and the right rail 107b to enable mounting the left rail 107*a* and the right rail 107*b* in predetermined positions on the main frame 103.

Also, a left bracket 108*a* is mounted rearward from the screw insertion hole 107*c* of the left rail 107*a* to project rightward in the vehicle width direction. Also, a right bracket 108*b* is mounted rearward from the screw insertion hole 107*d* of the right rail 107*b* to project leftward in the vehicle width direction. Also, the left bracket 108*a* and the right bracket 108*b* are provided to fix thereto a rear end of the fuel tank 129, which will be further described later.

Also, the left bracket 108*a* and the right bracket 108*b* are made not to overlap at least an upper portion of the rear suspension 126. That is, the upper portion of the rear suspension 126 is provided in a region surrounded by the left rail 107*a*, the right rail 107*b*, the left bracket 108*a*, the right bracket 108*b*, and the support 106.

Also, a reinforcement plate 109 is fixed to the left rail 107*a* and the right rail 107*b*, respectively, to connect the left rail 107*a* and the right rail 107*b*. The left and right sides of a reinforcement plate 109, respectively, are disposed rearward from the left bracket 108*a* of the left rail 107*a* and the right bracket 108*b* of the right rail 107*b*. Also, a left bracket 110*a* is mounted on the left rail 107*a*, and a right bracket 110*b* is mounted on the right rail 107*b*. Both brackets 110*a* and 110*b* are disposed rearward from the reinforcement plate 109. The left bracket 110*a* and the right bracket 110*b*, respectively, are provided to mount thereto a rear end of a seat 130 which will be more completely described later.

As shown in FIG. 24, a left stay 111*a* of a back stay 111 is connected between the left frame 103*a* and the left rail 107*a* as shown in FIG. 24. Specifically, a front end of the left stay 111*a* is fixed to a rear portion of the left frame 103*a* by a screw 161 and a rear end of the left stay 111*a* is welded to the left rail 107*a*. Also, a right stay 111*b* (see FIG. 26) of the back stay 111 is connected between the right frame 103*b* (see FIG. 26) and the right rail 107*b* (see FIG. 26). Specifically, a front end of the right stay 111*b* is fixed to a rear portion of the right frame 103*b* by a screw (not shown) and a rear end of the right stay 111*b* is welded to the right rail 107*b*. As shown in FIG. 26, front ends of the left stay 111*a* and the right stay 111*b*, respectively, are provided on the left frame 103*a* and the right frame 103*b* with a predetermined spacing D3 therebetween in the vehicle width direction. The predetermined spacing D3 between the left stay 111*a* and the right stay 111*b* is made larger than the predetermined spacing D1 between the left rail 107*a* and the right rail 107*b*. Accordingly, the predetermined spacing D3 between the left stay 111*a* and the right stay 111*b* is made larger than a length D2 of the rear suspension 126 in the vehicle width direction.

As shown in FIG. 24, a downtube 112 is provided below the head pipe 102 to extend rearwardly downward from the head pipe 102. Provided at a lower end of the downtube 112 are a left lower frame 113*a* and a right lower frame (not shown) that jointly form a lower frame 113. The left lower frame 113*a* connects the downtube 112 and the left frame 103*a*, and the right lower frame (not shown) connects the downtube 112 and the right frame 103*b* (see FIG. 25).

Also, a turnable handle 114 is provided above the head pipe 102. Also, a Zeichen plate 115 is provided in front of the head pipe 102 to cover the front of the head pipe 102. Also, a pair of front forks 116 are provided below the head pipe 102. An axle shaft 117 is fixed to lower ends of the pair of front forks 116. A front wheel 118 is mounted rotatably to the axle shaft 117. A front fender 119 is provided above the front wheel 118 to cover an upper portion of the front wheel 118.

Figure 27:
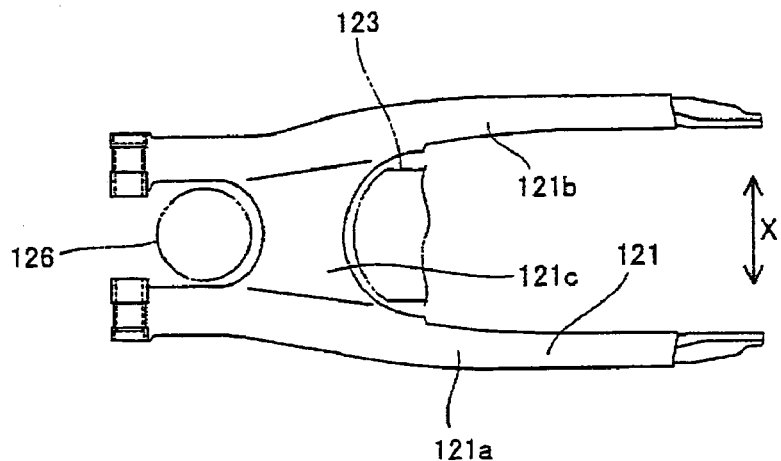
FIG. 27 is a plan view showing a rear arm of the motorcycle shown in FIG. 24.

Also, a pivot shaft 120 is provided on the main frame 103. The pivot shaft 120 supports a front end of a rear arm 121 to enable the same to swing vertically. As shown in FIG. 27, the rear arm 121 includes a left arm portion 121*a*, a right arm portion 121*b*, and a connection 121*c* connecting the left arm portion 121*a* and the right arm portion 121*b*. Also, the rear suspension 126 described later is provided in a region surrounded by the front of the left arm portion 121*a*, the front of the right arm portion 121*b*, and the connection 121*c*. Also, an axle shaft 122 is fixed to a rear end of the rear arm 121 as shown in FIG. 24. A rear wheel 123 is mounted rotatably to the axle shaft 122. Also, a driven sprocket 123*a* is provided on the rear wheel 123 to rotate together with the rear wheel 123. A chain 124 meshes with the driven sprocket 123*a*, the chain 124 being driven by an engine 131 which will be more fully described later. Also, the driven sprocket 123*a* and the chain 124 are provided on the left in a vehicle width direction. Also, a rear fender 125 is provided above the rear wheel 123 to cover an upper portion of the rear wheel 123.

The rear suspension 126 is provided rearward from the main frame 103 and forward from the rear wheel 123 as shown in FIGS. 24 and 26. The rear suspension 126 includes a body portion 126*a* and a subtank portion 126*b* connected to the body portion 126*a*. A compression coil spring 126*c* is provided on an outer periphery of the body portion 126*a*. Also, the body portion 126*a* is contractible and extendable in a vertical direction and absorbs an impact when the rear wheel 123 moves vertically. Also, an upper side of the body portion 126*a* is mounted swingably to the support 106 of the connecting member 105 (see FIG. 26) of the main frame 103. Specifically, an upper mount 126*d* (see FIG. 31) is provided on an upper side of the body portion 126*a* of the rear suspension 126. The upper mount 126*d* is mounted swingably to a suspension mount 106*c* of the support 106 by a connecting member (not shown). Also, a lower side of the body portion 126*a* is connected to the rear arm 121 (see FIG. 24) through a connecting mechanism 127 (see FIG. 24). Specifically, a lower mount 126*e* (see FIG. 31) is provided on the lower side of the body portion 126*a* of the rear suspension 126. The lower mount 126*e* is mounted swingably to the connecting mechanism 127 (see FIG. 24) by a connecting member (not shown). Thereby, it becomes possible to absorb an impact when the rear arm 121 (see FIG. 24) and the rear wheel 123 swing vertically.

The subtank portion 126*b* is provided on the upper side of the body portion 126*a* with a length of the subtank portion 126*b* extending along the vehicle width direction and provided rearward from a central axis of the body portion 126*a* in a longitudinal direction. Also, a length L1 of the subtank portion 126*b* in the vehicle width direction is larger than a length D4 of the body portion 126*a* in the vehicle width direction as shown in FIG. 26 and smaller than the predetermined spacing D1 between the left rail 107*a* and the right rail 107*b*. As shown in FIG. 26, the length D2 of the rear suspension 126 in the vehicle width direction means the length L1 of the subtank portion 126*b* in the vehicle width direction.

Figure 31:
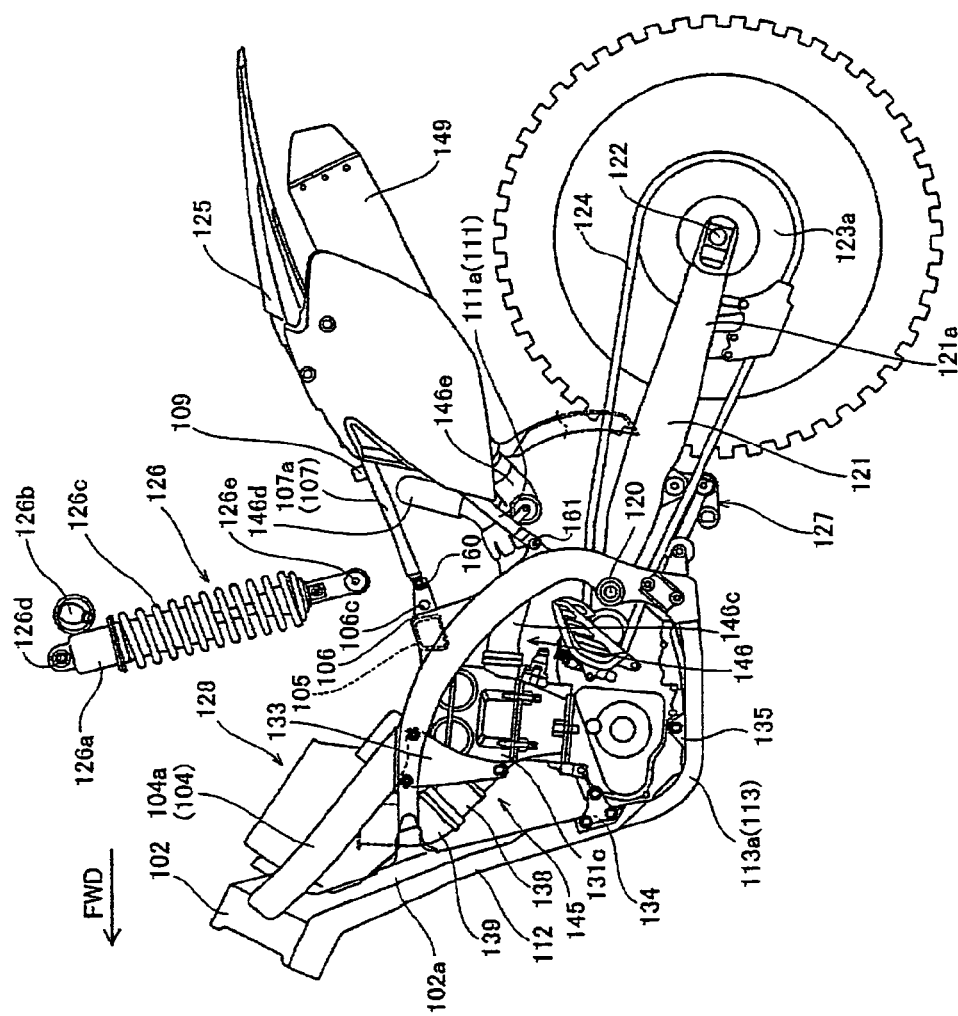
FIG. 31 is a side view showing the motorcycle shown in FIG. 24.

By forming the seat rail 107, the back stay 111, and the rear suspension 126 as described above, it becomes possible to remove the rear suspension 126 even after the seat rail 107 and the back stay 111 are mounted to the main frame 103 as shown in FIG. 31. Also, the rear suspension 126 including the subtank portion 126*b* can be provided on the support 106 of the connecting member 105 of the main frame from between the left rail 107*a* and the right rail 107*b*.

Also, an air cleaner 128 is provided between the left tank rail 104*a* and the right tank rail 104*b* of the tank rail 104 as shown in FIG. 25. The air cleaner 128 is provided to extend forwardly upward from the engine 131, which will be more fully described later, as shown in FIG. 24. As shown in FIG.

Figure 29:
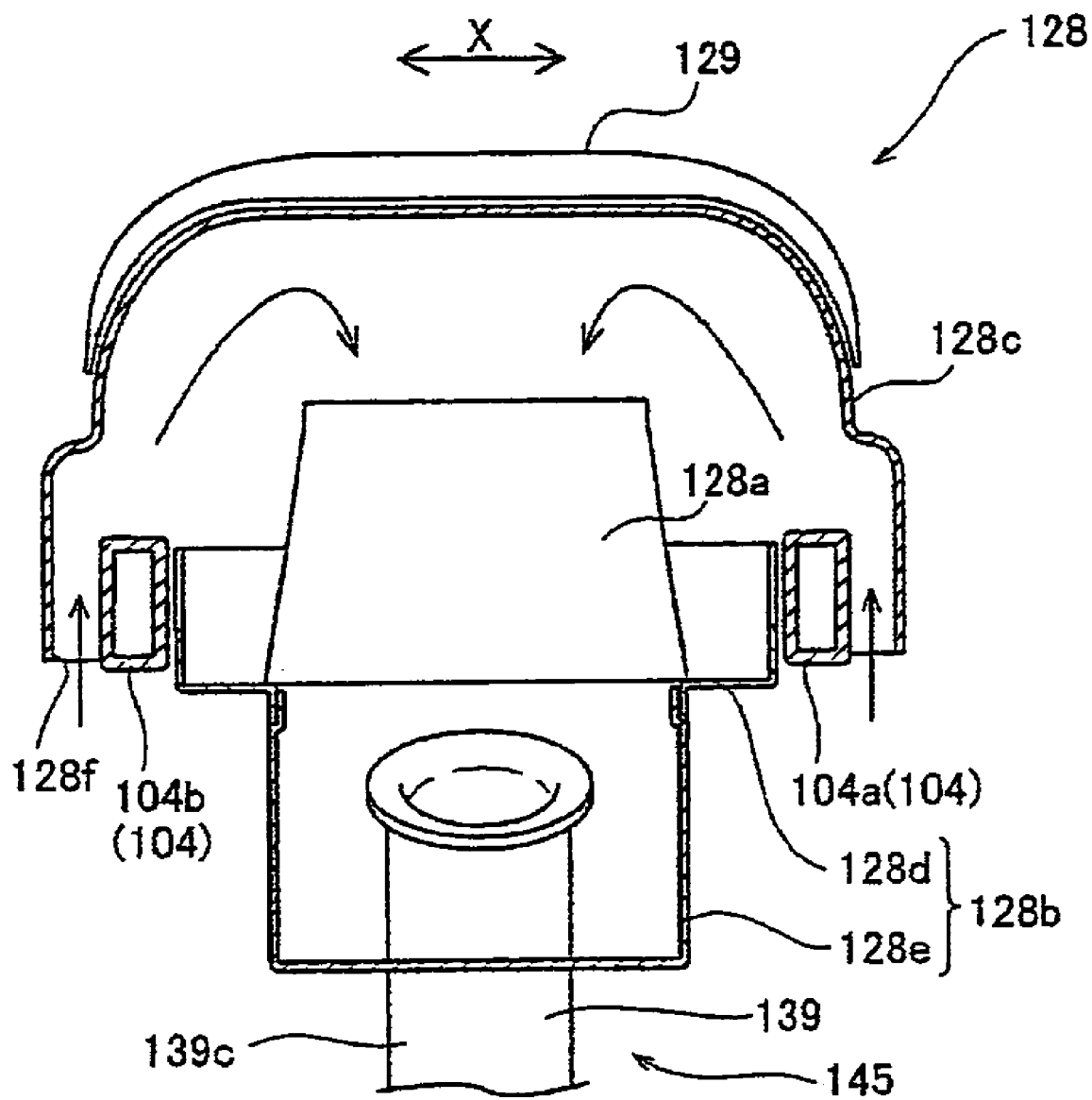
FIG. 29 is a cross sectional view taken along line V-V in FIG. 28.

28, the air cleaner 128 includes a filter portion 128a, a cleaner case portion 128b, in which the filter portion 128a is provided, and a cover member 128c that covers an upper portion of the cleaner case portion 128b. The filter portion may be formed of sponge. The cleaner case portion 128b includes an upper case portion 128d, to which the filter portion 128a is fixed, and a lower case portion 128e, in which a funnel 139 described later is provided. An opening 128f is formed on a forward and obliquely lower portion of the cover member 128c. As shown in FIG. 29, the opening 128f is formed to permit an air from the front to flow thereinto and an air flowing from the opening 128f passes through the filter portion 128a to flow into the lower case portion 128e of the cleaner case portion 128b. Also, the opening 128f is provided rearwardly of the Zeichen plate 115 (see FIG. 24). Thereby, the Zeichen plate 115 covers the opening 128f of the cover member 128c, so that it is possible to inhibit foreign matters (water, small stone, etc) from entering the opening 128f of the cover member 128c.

Figure 28:
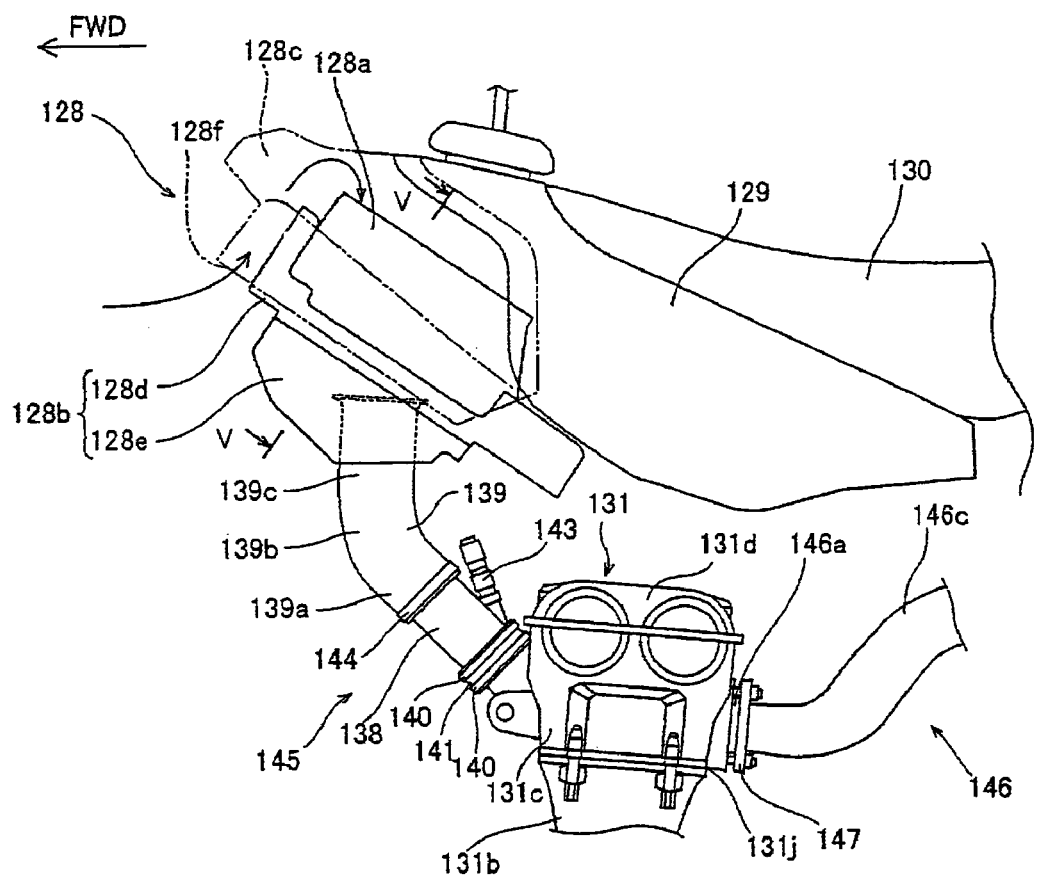
FIG. 28 is a side view showing the neighborhood of an engine of the motorcycle shown in FIG. 24.

Also, the fuel tank 129 made of a resin is provided rearwardly of the air cleaner 128 to extend rearwardly of the air cleaner 128 as shown in FIG. 28. Also, the front of the seat 130 is provided above the fuel tank 129. The seat 130 is formed to extend rearwardly of the fuel tank 129.

Figure 30:
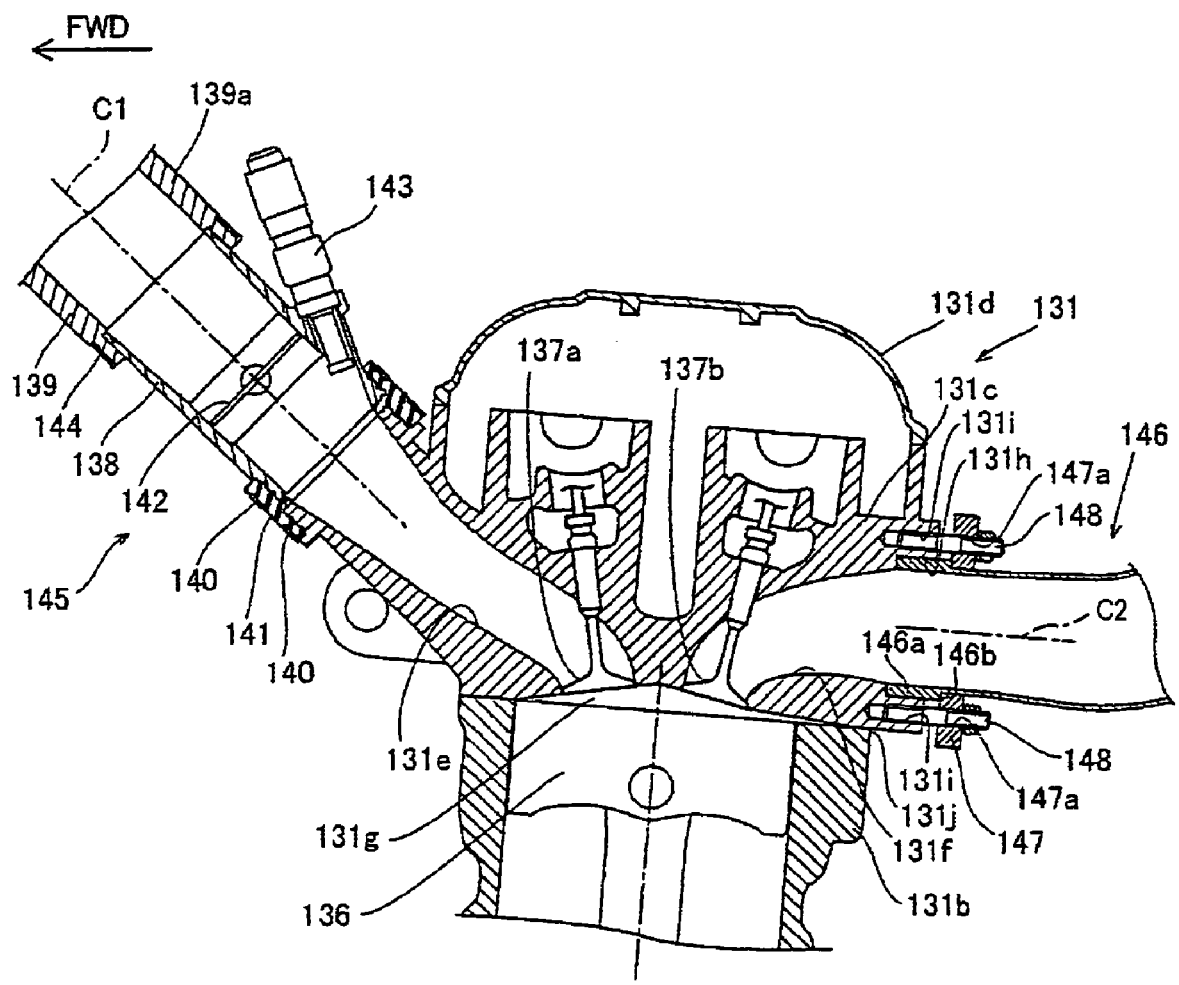
FIG. 30 is a cross sectional showing the engine of the motorcycle shown in FIG. 24.

Also, the engine 131 is provided below the main frame 103 as shown in FIG. 24. The engine 131 is fixed by a support plate 133 fixed to the main frame 103, a support plate 133 fixed to the downtube 112, and a support plate 135 fixed to the lower frames 113. Also, the engine 131 includes, as shown in FIG. 30, a crank case portion 131a (see FIG. 24), a cylinder portion 131b, in which a piston 136 is provided, a cylinder head portion 131c provided above the cylinder portion 131b, and a cylinder head cover portion 131d. Also formed on the cylinder head portion 131c of the engine 131 are an intake port 131e extending forward from the engine 131, an exhaust port 131f extending rearward from the engine 131, and a combustion chamber 131g, to which the intake port 131e and the exhaust port 131f are connected. Also, an intake valve 137a for opening and closing of the intake port 131e is provided on the intake port 131e and an exhaust valve 137b for opening and closing of the exhaust port 131f is provided on the exhaust port 131f.

Also, a throttle body 138 and a funnel 139 made of a resin are connected to the intake port 131e formed on the front of the cylinder head portion 131c. Specifically, one end side (downstream side) of a connecting member 141 made of rubber is connected to an opened end of the intake port 131e by a band member 140. A straight-shaped throttle body 138 in an upwardly inclined state is fixed to the other end side (upstream side) of the connecting member 141 by a band member 140. A throttle valve 142 for adjustment of the quantity of an air passing through the intake port 131e is provided in the throttle body 138. Also, a fuel injection device 143 for supplying of a fuel, e.g., gasoline, to the engine 131 is mounted to the throttle body 138. The fuel injection device 143 is mounted to a rear side of the throttle body 138 that is opposite to a front side of the throttle body facing the downtube 112. Also, the funnel 139 is fixed to an upstream portion of the throttle body 138 by a band member 144 to supply an air passing through the air cleaner 128 to the engine 131. The connecting member 141, the throttle body 138, and the funnel 139 collectively constitute an intake pipe 145. A lower portion of the intake pipe 145 is provided between the engine 131 and the downtube 112.

Also, an upstream portion of the intake port 131e, the connecting member 141, the throttle body 138, and a downstream portion 139a of the funnel 139 are formed substantially straight to extend forwardly upward as indicated by a center line C1 in FIG. 30. Also, the funnel 139 includes a curved portion 139b provided upstream of the downstream portion 139a and an upstream portion 139c provided upstream of the curved portion 139b and extending substantially straightly toward the air cleaner 128 as shown in FIG. 28. An upper portion of the upstream portion 139c is provided within the cleaner case portion 128b of the air cleaner 128.

As shown in FIG. 30, an exhaust pipe 146 is connected to the exhaust port 131f formed rearwardly of the cylinder head portion 131c. Specifically, a recess 131h and two threaded holes 131i are formed in the vicinity of an opened end of the exhaust port 131f of the cylinder head portion 131c. A connection 146a of the exhaust pipe 146 is inserted into the recess 131h. Also, a stepped portion 146b is formed at a downstream end of the connection 146a of the exhaust pipe 146 and a fixing member 147 is mounted to the stepped portion 146b. Two threaded holes 147a of the fixing member 147 and two threaded holes 131i of the cylinder head portion 131c, respectively, are screwed by stud bolts 148 whereby the fixing member 147 is fixed to the cylinder head portion 131c. In this manner, the connection 146a of the exhaust pipe 146 is fixed to the cylinder head portion 131c.

A neighboring portion of the connection 146a of the exhaust pipe 146 connected to the cylinder head portion 131c is formed substantially straight as indicated by a center line C2 in FIG. 30. In this manner, by forming the neighboring portion of the exhaust pipe 146 near to the engine 131 straight, exhaust resistance of an air discharged from the engine 131 can be reduced as compared with the case where a portion of the exhaust pipe 146 neighboring to the engine 131 is curved, and the case where a portion of the exhaust pipe 146 away from the engine 131 is formed straight. Thereby, the engine 131 can be further improved in performance.

As shown in FIG. 24, the exhaust pipe 146 includes a portion 146c connected to the vicinity of the straight portion and extending rearwardly upward. Also, the exhaust pipe 146 includes a coil-shaped portion 146d connected to the portion 146c, and a rear portion 146e provided downstream of the coil-shaped portion 146d and extending rearwardly upward. The coil-shaped portion 146 may have a spiral shape. The portion 146c of the exhaust pipe 146 is formed to pass on the right of the rear suspension 126 as shown in FIG. 26. That is, the exhaust pipe 146 is formed to be curved rightward from the straight portion so as to keep away from the body portion 126a and the subtank portion 126b of the rear suspension 126. Also, a rear end of the portion 146c is connected to the coil-shaped portion 146d.

The coil-shaped portion 146d is provided rearward from the rear suspension 126 and provided rearwardly downward from a center portion of the seat 130 and below an upper surface of the seat rail 107 as shown in FIG. 24. Also, as shown in FIG. 26, the coil-shaped portion 146d, as taken from a plan view of the motorcycle 101, diverges in the vehicle width direction and is provided within an outside of the left rail 107a and an outside of the right rail 107b. Also, the coil-shaped portion 146d is formed to be curved rearwardly upward from the suspension 126.

Also, the rear portion 146e of the exhaust pipe 146 is connected to a muffler 149 that is provided rearwardly upward from the engine 131. The muffler 149 is provided on the right side of the motorcycle 1 in the vehicle width direction.

Figure 32:
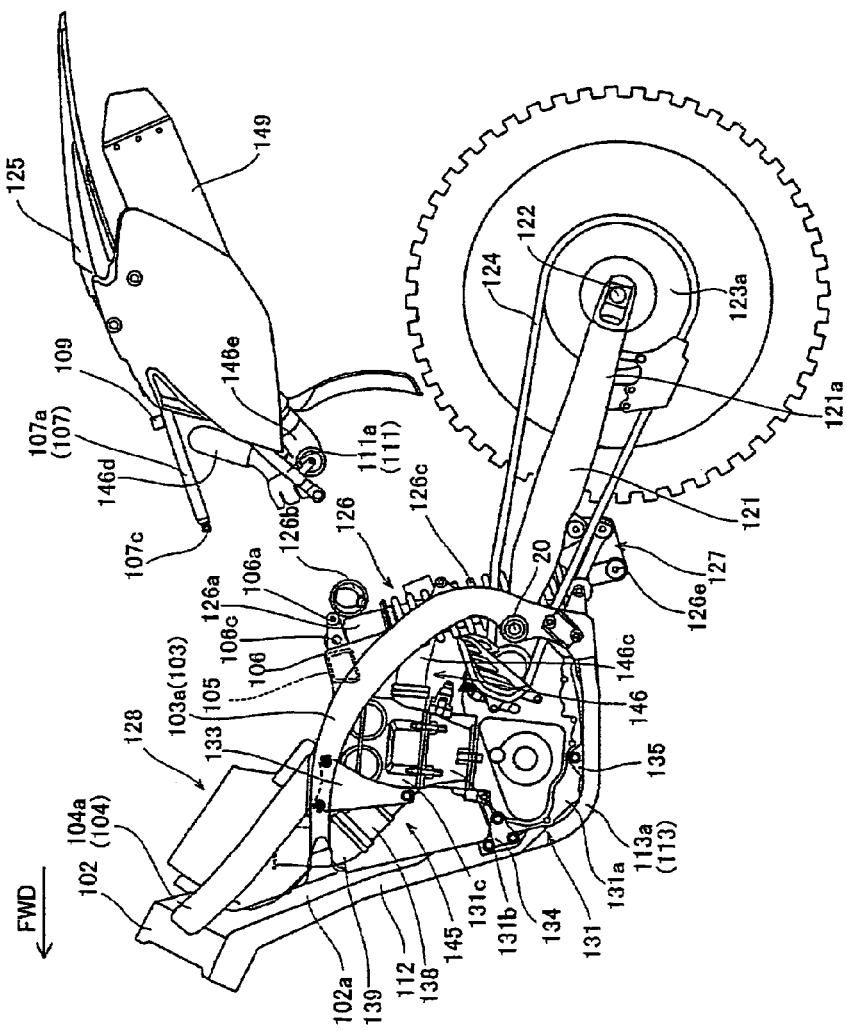
FIG. 32 is a view showing the assembling process of a rear suspension and a rear frame of the motorcycle according to the second exemplary embodiment of the invention.

FIG. 32 illustrates the assembling process of the rear suspension and the rear frame of the motorcycle according to the second exemplary embodiment of the invention. Subsequently, the assembling process of the rear suspension 126 and the rear frame of the motorcycle 101 according to the second exemplary embodiment will be described with reference to FIGS. 25, 26, 31, and 32.

First, the suspension 126 is mounted to the main frame 103 and the connection mechanism 127 as shown in FIG. 32. Specifically, the upper mount 126d of the body portion 126a of the rear suspension 126 is mounted to the suspension mount 106c of the support 106 for the connecting member 105 of the main frame 103 by a connecting member (not shown). The lower mount 126e is mounted to the connection mechanism 127 through a connecting member (not shown). Thereby, the rear suspension 126 is mounted swingably to the main frame 103 and the connection mechanism 127.

Subsequently, the rear frame (the seat rail 107 and the back stay 111) is mounted to the main frame 103 as shown in FIG. 31. In addition, the rear end of the back stay 111 (the left stay 111a and the right stay 111b) is beforehand welded to the seat rail 107 (the left rail 107a and the right rail 107b). Also, when the rear frame (the seat rail 107 and the back stay 111) is to be mounted to the main frame 103, the coil-shaped portion 146d of the exhaust pipe 146, the muffler 149, and the rear fender 125 are beforehand mounted to the rear frame (the seat rail 107 and the back stay 111).

Specifically, the seat rail 107 and the back stay 111 are provided in predetermined positions on the main frame 103. At this time, the portion 146c of the exhaust pipe 146 is formed to be curved on the right of the suspension 126, so as to be connected to the coil-shaped portion 146d of the exhaust pipe 146 without being obstructed by the rear suspension 126. Also, since the spacing D1 between the left rail 107a and the right rail 107b is larger than the length D2 of the rear suspension 126 in the vehicle width direction, it becomes possible to provide the seat rail 107 on the support 106 for the main frame 103 without being obstructed by the suspension 126.

Subsequently, the seat rail 107 is mounted to the main frame 103 as shown in FIG. 31. Specifically, the left rail 107a is fixed to the left side of the support 106 for the main frame 103 by screwing the screw 160 to the threaded hole 106a through the screw insertion hole 107c of the left rail 107a. Also, the right rail 107b is likewise fixed to the right side of the support 106 for the main frame 103 by screwing the screw 160 to the threaded hole 106b through the screw insertion hole 107d of the right rail 107b.

Subsequently, the back stay 111 is mounted to the main frame 103. Specifically, the front end of the left stay 111a is fixed to the rear portion of the left frame 103a by the screw 161 and the front end of the right stay 111b is fixed to the rear portion of the right frame 103b by a screw (not shown). In this manner, assembling of the suspension 126 and the rear frame (the seat rail 107 and the back stay 111) is completed.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

For example, while the first and second exemplary embodiments show an example, in which the invention is applied to a motorcycle, the invention is not limited thereto but applicable to other vehicles such as automobiles, three-wheelers, ATV (All Terrain Vehicle; irregular terrain running vehicle) provided that they comprise an exhaust pipe.

Also, while the first and second exemplary embodiments show an example, in which a vehicle is applied to a motorcycle of offroad specifications, the invention is not limited thereto but a vehicle may be applied to a motorcycle of onroad specifications such as scooter.

Also, while the first exemplary embodiment shows an example of configuring the exhaust pipe in a manner to enable the same to be divided into the engine connection and the coil-shaped portion, the invention is not limited thereto but the exhaust pipe may be configured to enable division into three or more parts.

Also, while the first exemplary embodiment shows an example, in which the engine is provided with a cylinder axis inclined rearward, the invention is not limited thereto but the engine may be provided so that a cylinder axis is not inclined rearward.

Also, while the first exemplary embodiment shows an example, in which the coil-shaped portion of the exhaust pipe is supported by the left stay, the invention is not limited thereto but the coil-shaped portion may be supported by the right stay or the seat rail.

Figure 33:
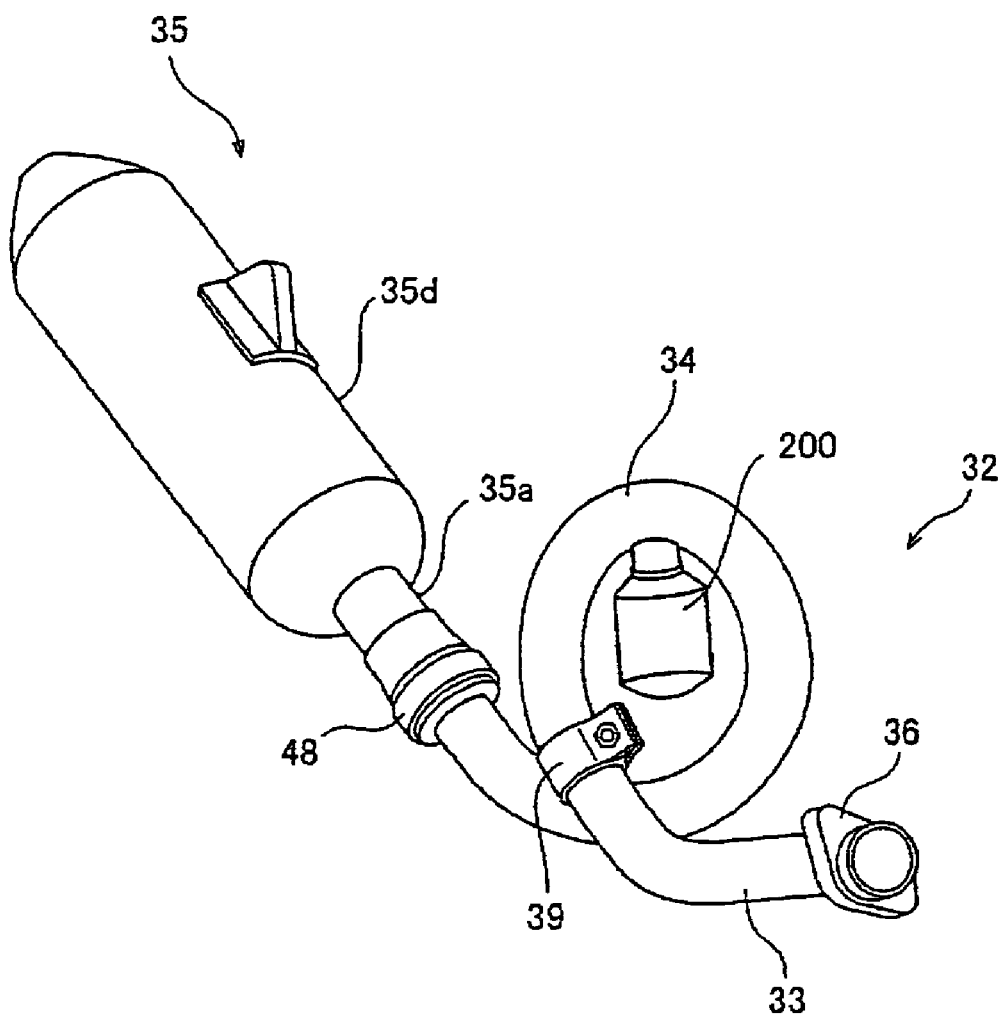
FIG. 33 is a perspective view showing an arrangement of a resonator of a motorcycle according to a modification of the first exemplary embodiment of the invention.

Also, while the first exemplary embodiment shows an example, in which the tank portion is provided on the engine connection of the exhaust pipe, the invention is not limited thereto but the tank portion may be connected to a portion except the engine connection of the exhaust pipe. Like a modification of the first exemplary embodiment shown in FIG. 33, a tank portion 200 may be connected to an inside of a coil portion of a coil-shaped portion 34, for example.

What is claimed is:

1. A vehicle, comprising:
   an engine,
   a rear wheel,
   a rear suspension that absorbs an impact when the rear wheel moves vertically, and
   an exhaust pipe having at least two separate portions including an engine connection and a wound portion, a front end of the engine connection being connected to a rear surface of the engine, the wound portion being provided between the rear suspension and the rear wheel and extending in a vehicle width direction, a front end of the wound portion being connected to a rear end of the engine connection at a position between the rear suspension and the rear wheel,
   wherein the entire wound portion, taken from a side of the vehicle, is disposed rearward from the rear suspension, and
   wherein, taken from a side of the vehicle, the engine connection and the rear suspension intersect each other, such that the engine connection has a portion that overlaps the rear suspension, and the rear suspension, taken from a side of the vehicle, protrudes upward from an uppermost point of the overlapping portion of the engine connection.

2. The vehicle according to claim 1, wherein, taken from a side of the vehicle, the rear end of the engine connection is disposed rearward from a portion of the rear suspension that intersects the engine connection.

3. The vehicle according to claim 1, wherein the wound portion forms a loop that extends essentially perpendicular to a vehicle length direction.

4. The vehicle according to claim 1, further comprising a clamp member for connecting the engine connection and the wound portion together.

5. The vehicle according to claim 1, further comprising:
   a main frame, and
   a rear frame extending rearward from the main frame and extending above the rear suspension, and
   wherein the wound portion is supported by the rear frame.

6. The vehicle according to claim 1, further comprising a muffler connected to a rear end of the wound portion.

7. The vehicle according to claim 1, wherein the rear suspension includes a subtank portion extending in the vehicle width direction, and the position at which the front end of the wound portion is connected to the rear end of the engine connection is disposed below the subtank portion.

8. The vehicle according to claim 1, further comprising a fuel tank and wherein the wound portion of the exhaust pipe, taken from a side view of the vehicle, is disposed rearward from the fuel tank.

9. The vehicle according to claim 1, wherein the vehicle is a motorcycle.

10. The vehicle according to claim 1, wherein the exhaust pipe is separable into the engine connection and the wound portion.

11. The vehicle according to claim 1, wherein the exhaust pipe is separable into each of the at least two separate portions.

12. The vehicle according to claim 1, wherein the wound portion has a coil shape.

13. The vehicle according to claim 1, further comprising a left rail and a right rail that extend substantially in parallel to each other in a vehicle length direction, and wherein the left and right rails are a first distance apart from each other in the vehicle width direction, and the first distance is greater than a length of the rear suspension in the vehicle width direction.

14. The vehicle according to claim 13, further comprising a left rear frame and a right rear frame, and wherein a front end of the left rear frame is a second distance apart from a front end of the right rear frame in the vehicle width direction, and the second distance is greater than the first distance.

15. The vehicle according to claim 13, wherein the rear suspension includes a subtank portion extending in the vehicle width direction, and the length of the rear suspension is a length of the subtank portion in the vehicle width direction.

16. The vehicle according to claim 15, wherein the rear suspension includes a body portion, and the length of the subtank portion in the vehicle width direction is larger than the length of the body portion in the vehicle width direction.

17. A vehicle, comprising:

an engine, a rear wheel, a rear suspension that absorbs an impact when the rear wheel moves vertically, and an exhaust pipe having at least two separate portions including an engine connection and a wound portion, a front end of the engine connection being connected to a rear surface of the engine, the wound portion being provided between the rear suspension and the rear wheel and extending in a vehicle width direction, a front end of the wound portion being connected to a rear end of the engine connection at a position between the rear suspension and the rear wheel, wherein the wound portion includes a first portion extending in a vehicle width direction and being disposed to face a rear side of the rear suspension, and the first portion extends from one side of the vehicle to the other side of the vehicle in a vehicle width direction, and wherein, taken from a side of the vehicle, the engine connection and the rear suspension intersect each other, such that the engine connection has a portion that overlaps the rear suspension, and the rear suspension, taken from a side of the vehicle, protrudes upward from an uppermost point of the overlapping portion of the engine connection.

* * * * *